(12) United States Patent
Kim et al.

(10) Patent No.: US 11,973,602 B2
(45) Date of Patent: *Apr. 30, 2024

(54) METHOD FOR TRANSMITTING AND RECEIVING HARQ INFORMATION IN WIRELESS COMMUNICATION SYSTEM, AND DEVICE THEREFOR

(71) Applicant: LG ELECTRONICS INC., Seoul (KR)

(72) Inventors: Kyuseok Kim, Seoul (KR); Suckchel Yang, Seoul (KR); Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,368

(22) Filed: May 19, 2022

(65) Prior Publication Data

US 2022/0286237 A1 Sep. 8, 2022

Related U.S. Application Data

(63) Continuation of application No. 17/108,565, filed on Dec. 1, 2020, now Pat. No. 11,368,257, which is a (Continued)

(30) Foreign Application Priority Data

Aug. 10, 2018 (KR) .................. 10-2018-0094031
Feb. 15, 2019 (KR) .................. 10-2019-0017914

(51) Int. Cl.
*H04L 1/1812* (2023.01)
*H04L 5/00* (2006.01)
(Continued)

(52) U.S. Cl.
CPC .......... *H04L 1/1819* (2013.01); *H04L 5/0055* (2013.01); *H04W 72/0446* (2013.01); *H04W 72/23* (2023.01)

(58) Field of Classification Search
CPC ... H04L 1/1819; H04L 5/0055; H04L 1/1614; H04L 1/1864; H04L 5/0051;
(Continued)

(56) References Cited

U.S. PATENT DOCUMENTS

2019/0045533 A1* 2/2019 Chatterjee ............. H04L 5/0053
2019/0103943 A1* 4/2019 Wang .................... H04L 1/1854
(Continued)

FOREIGN PATENT DOCUMENTS

CN 104754665 7/2015
WO WO2015026274 2/2015
WO WO2017161541 9/2017

OTHER PUBLICATIONS

Qualcomm, "Summery of DL/UL scheduling and HARQ management", R1-1805540, Apr. 16-20, 2018 (From Applicant's IDS) (Year: 2018).*

(Continued)

*Primary Examiner* — Mang Hang Yeung
(74) *Attorney, Agent, or Firm* — Fish & Richardson P.C.

(57) ABSTRACT

A method for a terminal to transmit hybrid automatic repeat and request (HARQ) feedback information in a wireless communication system supporting coordinated multiple point (CoMP) transmission includes: receiving a first PDCCH and a second PDCCH from a first transmission node and a second transmission node, respectively; receiving, from the first transmission node and the second transmission node, a first PDSCH and a second PDSCH scheduled by the first PDCCH and the second PDCCH, respectively; determining HARQ-ACK codebook for the
(Continued)

first PDSCH and the second PDSCH; and transmitting HARQ feedback information for the determined HARQ-ACK codebook. The first and second PDCCHs include specific HARQ feedback timing information used for the CoMP. When a reception occasion for the first PDSCH and a reception occasion for the second PDSCH overlap, the HARQ feedback information is transmitted on a slot corresponding to the value indicated by the specific HARQ feedback timing information.

19 Claims, 16 Drawing Sheets

Related U.S. Application Data continuation of application No. PCT/KR2019/010239, filed on Aug. 12, 2019.

(51) Int. Cl.
*H04W 72/0446* (2023.01)
*H04W 72/23* (2023.01)

(58) Field of Classification Search
CPC ........... H04L 2001/0097; H04L 5/0094; H04L 5/0035; H04W 72/0446; H04W 72/23; H04B 7/024
USPC ........................................................ 370/329
See application file for complete search history.

(56) References Cited

U.S. PATENT DOCUMENTS

| | | | |
|---|---|---|---|
| 2019/0349142 A1* | 11/2019 | Aiba | H04L 1/1819 |
| 2019/0363840 A1* | 11/2019 | Wang | H04L 1/1854 |
| 2020/0007296 A1* | 1/2020 | Papasakellariou | H04L 5/001 |
| 2020/0045676 A1* | 2/2020 | Ryu | H04L 5/001 |
| 2020/0154467 A1* | 5/2020 | Gong | H04W 76/27 |
| 2021/0234640 A1 | 7/2021 | Cirik et al. | |

OTHER PUBLICATIONS

Huawei et al., Remaining Issues on Scheduling and HARQ, RI-1804431, 3GPP TSG RAN WG1 Meeting #92bis, Sanya, China, Apr. 7, 2018. (From Applicant's IDS) (Year: 2018).*

IZTE, Remaining Issues on DMRS, RI-1805832, 3GPP TSG RAN WGl Meeting #93, Busan, Korea, May 11, 2018 (From Applicant's IDS) (Year: 2018).*

3GPP TS 38.213, "3rd Generation Partnership Project; Technical Specification Group Radio Access Network; NR; Physical layer procedures for control (Release 15)," V15.0.1, Mar. 2018, 80 pages.

Extended European Search Report in European Appln. No. 19847518.8, dated Sep. 7, 2021, 12 pages.

Huawei, HiSilicon, "Remaining issues on scheduling and HARQ," R1-1804431, 3GPP TSG RAN WG1 Meeting #92bis, Sanya, China, Apr. 16-20, 2018, 16 pages.

International Search Report in International Appln. No. PCT/KR2019/010239, dated Dec. 13, 2019, 7 pages (with English translation).

LG Electronics, "Discussion on compact DCI format design," R1-1804570, 3GPP TSG RAN WG1 Meeting #92bis, Sanya, China, Apr. 16-20, 2018, 6 pages.

Qualcomm Incorporated, "Summary of DL/UL scheduling and HARQ management," R1-1805540, h3GPP TSG-RAN WG1 Meeting #92bis, Sanya, China, Apr. 16-20, 2018, 25 pages.

Samsung, "CR to TS 38.213 capturing the RAN1 #92bis and RAN1 #93 meeting agreements and aligning higher layer parameters with TS 38.331," R1-1807957, Presented at 3GPP TSG-RAN1 Meeting #93, Busan, Korea, May 21-25, 2018, 92 pages.

Zte, "Remaining issues on DMRS," R1-1805832, 3GPP TSG RAN WG1 Meeting #93, Busan, Korea,, May 21-25, 2018, 3 pages.

* cited by examiner

METHOD FOR TRANSMITTING AND RECEIVING HARQ INFORMATION IN WIRELESS COMMUNICATION SYSTEM, AND DEVICE THEREFOR

CROSS-REFERENCE TO RELATED APPLICATIONS

This application is a continuation of U.S. patent application Ser. No. 17/108,565, filed on Dec. 1, 2020, which is a continuation of International Application No. PCT/KR2019/010239, with the international filing date of Aug. 12, 2019, pursuant to 35 U.S.C. § 119(e), which claims the benefit of Korea Application No. 10-2019-0017914, filed on Feb. 15, 2019, and Korean Application No. 10-2018-0094031, filed on Aug. 10, 2018, the contents of which are hereby incorporated by reference herein in their entirety.

TECHNICAL FIELD

The present disclosure relates to a wireless communication system and, more particularly, to a method of transmitting and receiving hybrid automatic repeat and request (HARQ) feedback information in a wireless communication system and an apparatus supporting the same.

BACKGROUND ART

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wideband, and device networking, are researched.

SUMMARY

The present disclosure provides a method of transmitting and receiving HARQ feedback information in a wireless communication system and an apparatus therefor.

Technical problems to be solved by the present disclosure are not limited by the above-mentioned technical problems, and other technical problems which are not mentioned above can be clearly understood from the following description by those skilled in the art to which the present disclosure pertains.

The present disclosure provides a method of transmitting and receiving HARQ feedback information in a system.

Specifically, a method of transmitting, by a terminal, hybrid automatic repeat and request (HARQ) feedback information in a wireless communication system supporting a coordinated multiple point (CoMP) includes receiving a first PDCCH and second PDCCH from a first transmission node and second transmission node, respectively, receiving, from the first transmission node and the second transmission node, a first PDSCH and second PDSCH scheduled by the first PDCCH and second PDCCH, respectively, determining a type of HARQ-ACK codebook for the first PDSCH and the second PDSCH, and transmitting HARQ feedback information for the determined HARQ-ACK codebook. The first PDCCH and the second PDCCH include specific HARQ feedback timing information used for the CoMP. When a reception occasion for the first PDSCH and a reception occasion for the second PDSCH overlap, the HARQ feedback information is transmitted on a slot corresponding to a value indicated by the specific HARQ feedback timing information.

Furthermore, in the present disclosure, the HARQ feedback information includes a first reception occasion feedback bit string of two bits for the overlapped first reception occasion among a plurality of reception occasions of the first PDSCH and the second PDSCH, and a second reception occasion feedback bit string for the second reception occasion which is another reception occasion except the first reception occasion among the plurality of reception occasions.

Furthermore, in the present disclosure, transmitting the HARQ feedback information includes setting, as a first HARQ feedback bit for the first PDSCH, one bit indicated by first control information among the first reception occasion feedback bit string when the first control information is received through the first PDCCH, and setting, as a second HARQ feedback bit for the second PDSCH, another bit indicated by second control information among the first reception occasion feedback bit string when the second control information is received through the second PDCCH.

Furthermore, in the present disclosure, the first control information includes a first indicator indicating one bit among the first reception occasion feedback bit string. The second control information includes a second indicator indicating one bit among the first reception occasion feedback bit string.

Furthermore, in the present disclosure, a bit string included in the first control information may include the index of a CDM group of a demodulation reference signal (DMRS) port indicated through the first PDCCH. A bit string included in the second control information may include the index of a CDM group of a demodulation reference signal (DMRS) port indicated through the second PDCCH.

Furthermore, in the present disclosure, the method may further include setting, as the first HARQ feedback bit, a first bit of the first reception occasion feedback bit string when the index of the CDM group of the DMRS port indicated through the first control information is smaller than the index of the CDM group of the DMRS port indicated through the second control information, and setting, as the second HARQ feedback bit, a second bit of the first reception occasion feedback bit string.

Furthermore, in the present disclosure, the method may further includes setting, as the first HARQ feedback bit, the second bit of the first reception occasion feedback bit string when the index of the CDM group of the DMRS port indicated through the first control information is greater than the index of the CDM group of the DMRS port indicated through the second control information, and setting, as the second HARQ feedback bit, the first bit of the first reception occasion feedback bit string.

Furthermore, in the present disclosure, the HARQ feedback information may include a reception occasion feedback bit string for a plurality of reception occasions of the first PDSCH, and a reception occasion feedback bit string for a plurality of reception occasions of the second PDSCH, which is subsequent to the bit string.

According to the present disclosure, there is an effect in that a UE can efficiently transmit HARQ-ACK/NACK for a PDSCH for a plurality of transmit-receive points (TRPs) using one resource.

Effects which may be obtained from the present disclosure are not limited by the above effects, and other effects that have not been mentioned may be clearly understood from the following description by those skilled in the art to which the present disclosure pertains.

DESCRIPTION OF DRAWINGS

The accompanying drawings included to help understanding of the present disclosure provide embodiments of the present disclosure and describe the technical characteristics of the present disclosure along with the detailed description.

DETAILED DESCRIPTION

Figure 1:
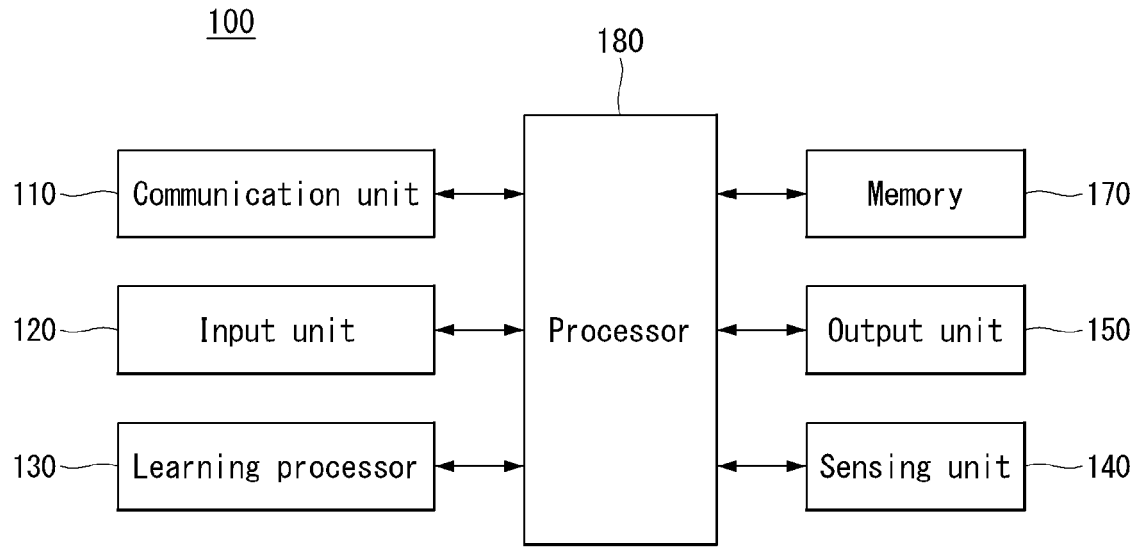
FIG. 1 illustrates an AI device 100 according to an embodiment of the present disclosure.

Hereinafter, preferred embodiments according to the present disclosure are described in detail with reference to the accompanying drawings. The detailed description to be disclosed herein along with the accompanying drawings is provided to describe exemplary embodiments of the present disclosure and is not intended to describe a sole embodiment in which the present disclosure may be implemented. The following detailed description includes detailed contents in order to provide complete understanding of the present disclosure. However, those skilled in the art will appreciate that the present disclosure may be implemented even without such detailed contents.

In some cases, in order to avoid making the concept of the present disclosure vague, the known structure and/or device may be omitted or may be illustrated in the form of a block diagram based on the core function of each structure and/or device.

In the present disclosure, a base station has a meaning as a terminal node of a network that directly performs communication with a terminal. In this document, a specific operation described as being performed by a base station may also be performed by an upper node of the base station according to circumstances. That is, it is evident that in a network configured with multiple network nodes including a base station, various operations performed for communication with a terminal may be performed by a base station or other network nodes in addition to the base station. A "base station (BS)" may be substituted with a term, such as a fixed station, a Node B, an evolved-NodeB (eNB), a base transceiver system (BTS), or an access point (AP). Furthermore, a "terminal" may be fixed or have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) apparatus, a machine-to-machine (M2M) apparatus or a device-to-device (D2D) apparatus.

Wireless communication systems are widely deployed to provide various types of communication services, such as voice or data. In general, the wireless communication system is a multiple access system capable of supporting communication with multiple users by sharing available system resources (bandwidth and transmission power). Examples of the multiple access system include a code division multiple access (CDMA) system, a frequency division multiple access (FDMA) system, a time division multiple access (TDMA) system, an orthogonal frequency division multiple access (OFDMA) system, and a single carrier-FDMA (SC-FDMA) system.

Hereinafter, downlink (DL) means communication from a base station to a terminal, and uplink (UL) means communication from a terminal to a base station. In the downlink, a transmitter may be a part of a base station, and a receiver may be a part of a terminal. In the uplink, a transmitter may be a part of a terminal, and a receiver may be a part of a base station.

Specific terms used in the following description are provided to help the understanding of the present disclosure, and the use of such a specific term may be changed to another form without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA). The CDMA may be implemented by a radio technology, such as universal terrestrial radio access (UTRA) or CDMA2000. The TDMA may be implemented by a radio technology, such as global system for mobile communications (GSM)/general packet radio service (GPRS)/enhanced data rates for GSM evolution (EDGE). The OFDMA may be implemented by a radio technology, such as IEEE 802.11 (Wi-Fi), IEEE 802.16 (WiMAX), IEEE 802-20, or E-UTRA (evolved UTRA). The UTRA is a part of a universal mobile telecommunication system (UMTS). 3rd generation partnership project (3GPP) long term evolution (LTE) is a part of an evolved UMTS (E-UMTS) using E-UTRA, and adopts OFDMA in the downlink and SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are radio access systems. That is, steps or parts not described to not clearly show the technical spirit of the present disclosure in the embodiments of the present disclosure may be supported by the standard documents. Furthermore, all terms described in this document may be described by the standard documents.

For a clear description, 3GPP LTE/LTE-A is basically described, but the technical features of the present disclosure are not limited thereto.

For example, reference may be made to the following documents.

3GPP LTE
36.211: Physical channels and modulation
36.212: Multiplexing and channel coding
36.213: Physical layer procedures
36.300: Overall description
36.331: Radio Resource Control (RRC)
37.213: Physical layer procedures for shared spectrum channel access 3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification
37.213: Physical layer procedures for shared spectrum channel access <Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of the training of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving or Autonomous-Driving>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a stationary device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, digital signage, a robot, and a vehicle.

Referring to FIG. 1, a terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200 using wired/wireless communication technologies. For example, the communication unit 110 may transmit and receive sensor information, user input, a learning model, or a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, and near field communication (NFC).

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, a lidar, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
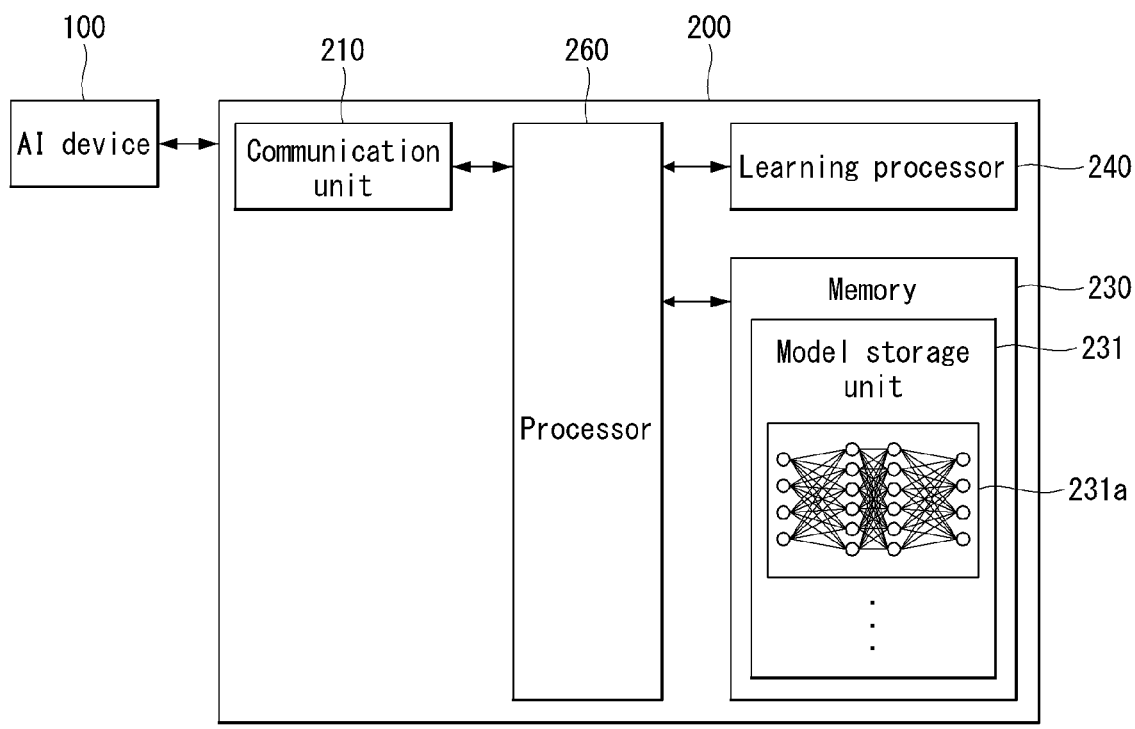
FIG. 2 illustrates an AI server 200 according to an embodiment of the present disclosure.

FIG. 2 illustrates an AI server 200 according to an embodiment of the present disclosure.

Referring to FIG. 2, the AI server 200 may mean an apparatus which trains an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
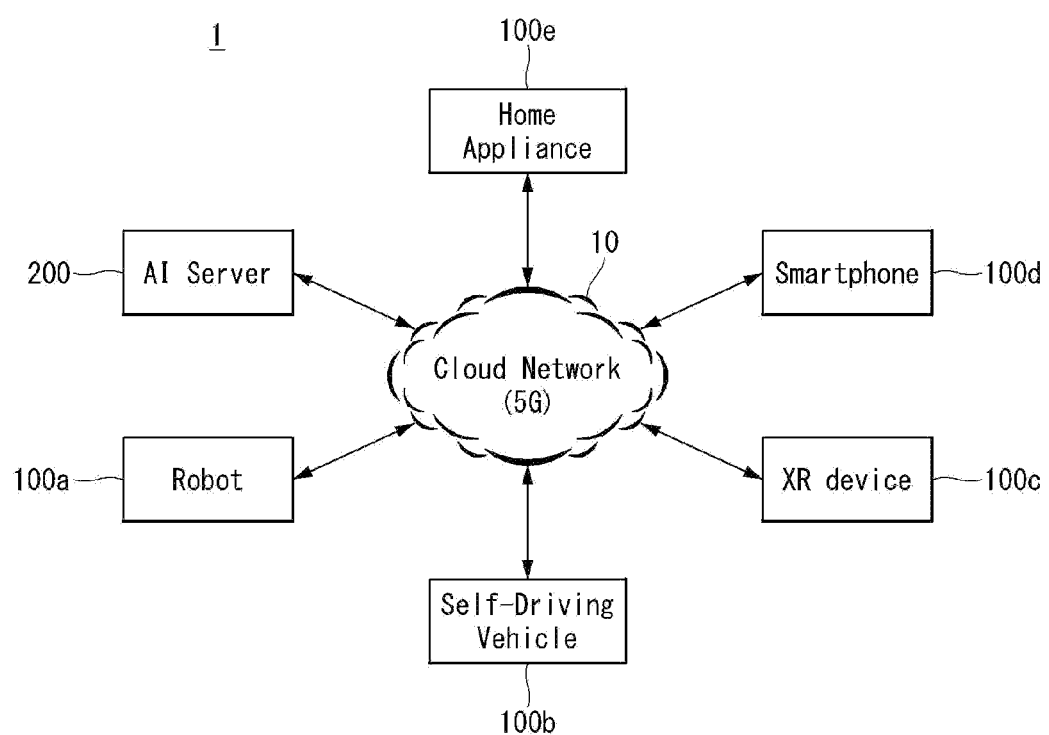
FIG. 3 illustrates an AI system 1 according to an embodiment of the present disclosure.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among a lidar, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI+Self-Driving>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

<AI+XR>

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI+Self-Driving+XR>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

A. System Architecture

Figure 4:
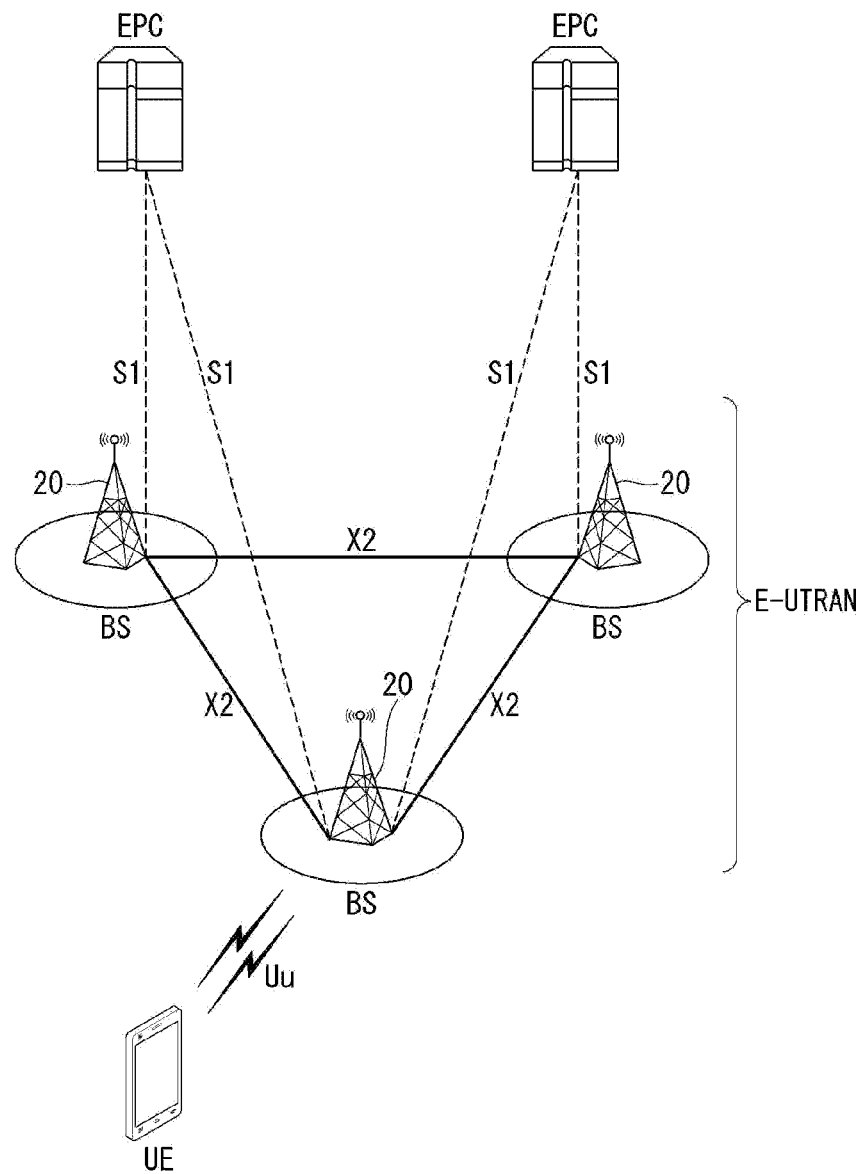
FIG. 4 illustrates an example of a 3GPP LTE system architecture.

FIG. 4 illustrates an example of a 3GPP LTE system architecture.

A wireless communication system may be called an evolved-UMTS terrestrial radio access network (E-UTRAN) or long term evolution (LTE)LTE-A system. Referring to FIG. 4, the E-UTRAN includes at least one base station (e.g., BS) 20 that provides a control plane and user plane to a terminal (e.g., UE) 10. The UE 10 may be stationary or mobile, and may be called another term, such as a mobile station (MS), a user terminal (UT), a subscriber station (SS), a mobile terminal (MT) or a radio device. In general, the BS 20 is a fixed station that communicates with the UE 10, and may be called another term, such as an evolved Node-B (eNB), a general Node-B (gNB), a base transceiver system (BTS), or an access point (AP). The BSs are interconnected through an X2 interface. The BSs are connected to an evolved packet core (EPC) through an S1 interface, more specifically, to a mobility management entity (MME) through an S1-MME and to a serving gateway (S-GW) through an S1-U. The EPC includes the MME, the S-GW and a packet data network-gateway (P-GW). The layer of a radio interface protocol between the UE and the network may be classified using a first layer (L1), second layer (L2) and third layer (L3) model based on lower three layers of an open system interconnection (OSI) well known in the communication system. Among them, a physical layer (PHY) belonging to the first layer provides information transmission services using a physical channel. A radio resource control (RRC) layer belonging to the third layer controls radio resources between the UE and the network. To this end, the RRC layer exchanges RRC messages between the UE and the base station.

Figure 5:
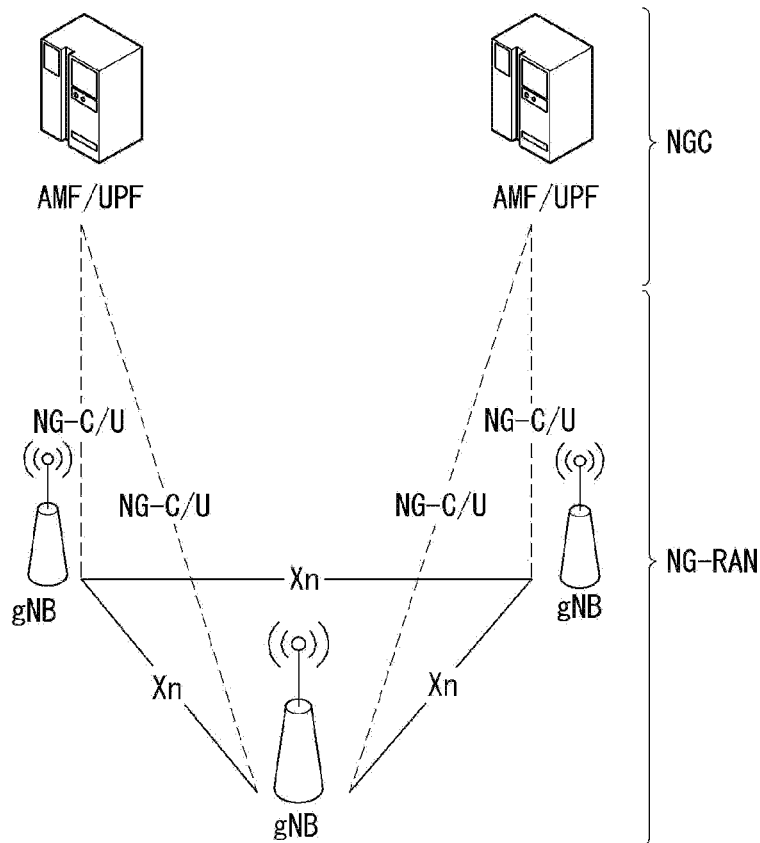
FIG. 5 is a diagram illustrating an example of a 3GPP NR system configuration.

FIG. 5 is a diagram illustrating an example of a 3GPP NR system configuration.

Referring to FIG. 5, an NG-RAN is configured with gNBs that provide an NG-RA user plane (new AS sublayer/PDCP/RLC/MAC/PHY) and a control plane (RRC) protocol termination for a UE. The gNBs are interconnected through an Xn interface. The gNB is connected to an NGC through an NG interface. More specifically, the gNB is connected to an access and mobility management function (AMF) through an N2 interface and to a user plane function (UPF) through an N3 interface.

B. Frame Structure

A frame structure in LTE is described.

Unless described otherwise in the LTE standard, the size of various fields in the time domain is represented as the number of time units Ts=1/(15000×2048) second. DL and UL transmission are organized as radio frames having Tf=307200×Ts=10 ms duration. Two radio frame structures are supported.

Type 1 applicable to FDD
Type 2 applicable to TDD (1) Frame Structure Type 1

The frame structure type 1 may be applied to both full duplex and half duplex FDD. Each radio frame is $T_f$=307200·$T_s$=10 ms, and is configured with 20 slots each having a length $T_{slot}$=15360·$T_s$=0.5 ms. The slots are numbered from 0 to 19. A subframe is defined as two contiguous slots. A subframe i is configured with slots 2i and 2i+1. In the case of FDD, 10 subframes may be used for DL transmission. 10 subframes may be used for UL transmission every 10 ms interval. UL and DL transmissions are separated in the frequency domain.

Figure 6:
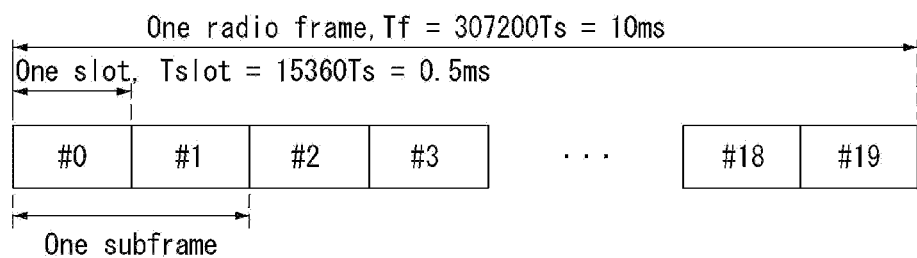
FIG. 6 illustrates a radio frame structure of a frame structure type 1.
Figure 7:
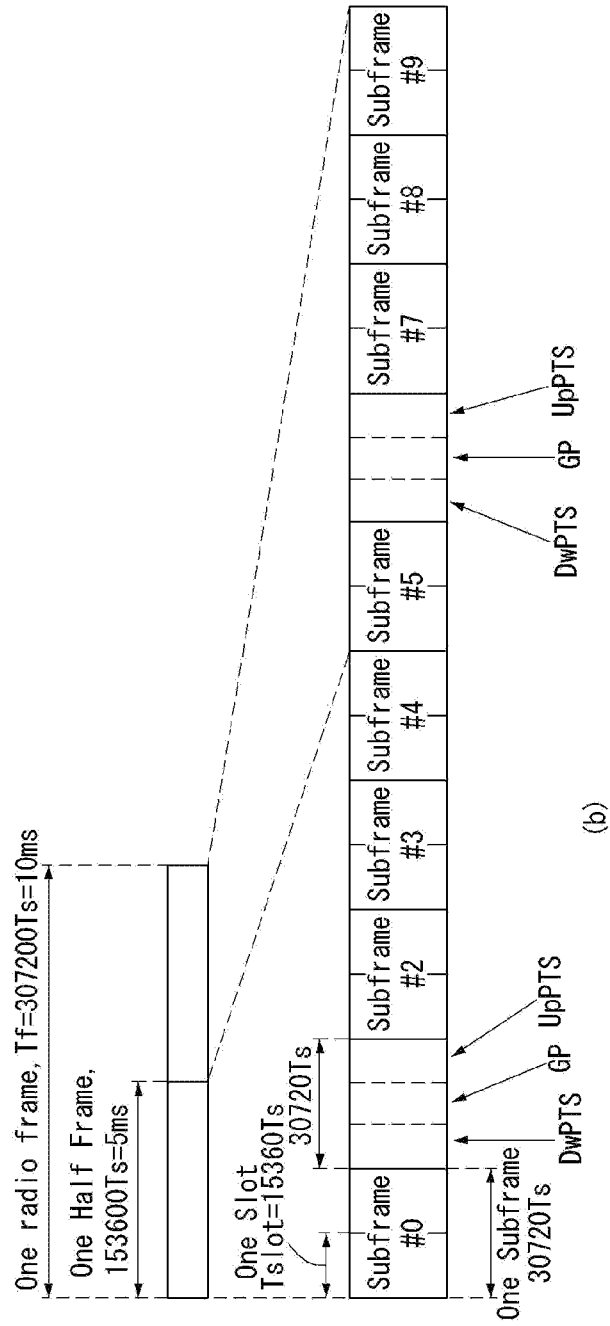
FIG. 7 illustrates a radio frame structure of a frame structure type 2.

FIG. 6 illustrates a radio frame structure of a frame structure type 1.

In FIG. 6, the radio frame includes 10 subframes. A subframe includes two slots in the time domain. The time taken to transmit one subframe is defined as a transmission time interval (TTI). For example, one subframe may have a length of 1 ms, one slot may have a length of 0.5 ms. One slot includes a plurality of orthogonal frequency division multiplexing (OFDM) symbols in the time domain. In 3GPP LTE, OFDMA is used in downlink. Accordingly, OFDM symbols are for representing one symbol period. OFDM symbols may also be called SC-FDMA symbols or symbol periods. A resource block (RB) is a resource assignment unit, and includes a plurality of neighboring subcarriers in one slot. The structure of the radio frame is illustrated for an illustrative purpose. As described above, the number of subframes included in a radio frame or the number of slots included in a subframe or the number of OFDM symbols included in a slot may be variously changed.

A frame structure in NR is described below.

Figure 8:
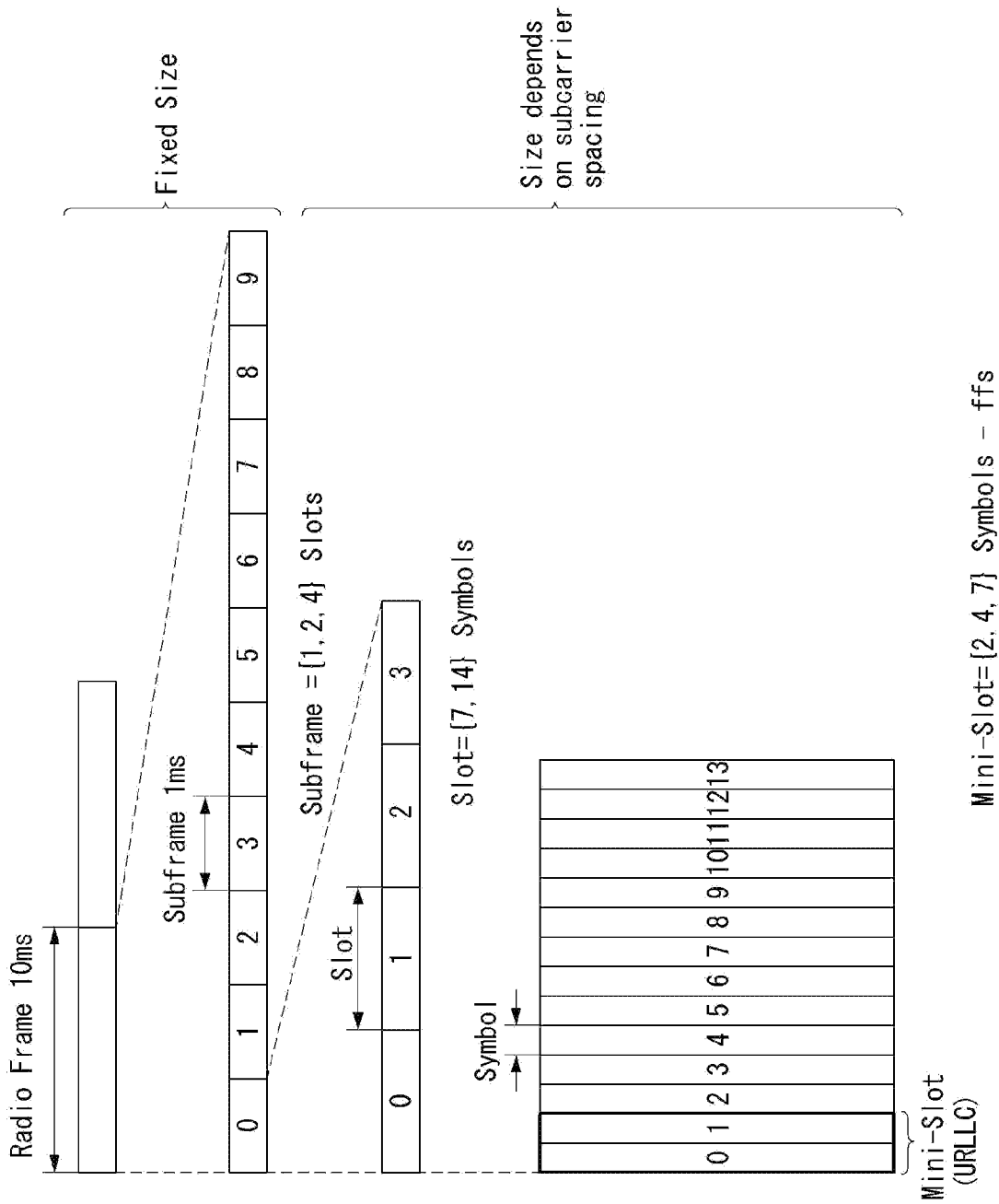
FIG. 8 is a diagram illustrating an example of a frame structure in NR.

FIG. 8 is a diagram illustrating an example of a frame structure in NR.

In the NR system, multiple numerologies may be supported. In this case, the numerology may be defined by a subcarrier spacing and cyclic prefix (CP) overhead. In this case, multiple subcarrier spacings may be derived by scaling a basic subcarrier spacing by an integer N (or μ). Furthermore, although it may be assumed that a very low subcarrier spacing is not used in a very high carrier frequency, a numerology used may be selected independently of a frequency band. Furthermore, in the NR system, various frame structures according to multiple numerologies may be supported.

Hereinafter, an orthogonal frequency division multiplexing (OFDM) numerology and frame structure which may be taken into consideration in the NR system are described. Multiple OFDM numerologies supported in the NR system may be defined as in Table 1 below.

TABLE 1

| μ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In relation to a frame structure in the NR system, the size of various fields in the time domain is represented as a multiple of a time unit of $T_s=1/(\Delta f_{max} \cdot N_f)$. In this case, $\Delta f_{max}=480 \cdot 10^3$, and $N_f=4096$. downlink and uplink transmissions are configured with radio frames having period of $T_f=(\Delta f_{max} N_f/100) \cdot T_s=10$ ms. In this case, the radio frame is configured with 10 subframes each having duration of $T_{sf}=(\Delta f_{max} N_f/1000) \cdot T_s=1$ ms. In this case, a set of frames may be present in the uplink and a set of frames may be present in the downlink. Furthermore, the transmission of an uplink frame number i from a UE needs to be started prior to $T_{TA}=N_{TA}T_s$ compared to the start of a corresponding downlink frame in the corresponding UE. With respect to a numerology μ, slots are numbered in an increasing sequence of $n_s^\mu \in \{0, \ldots, N_{subframe}^{slot,\mu}-1\}$ within a subframe and are numbered in an increasing sequence of $n_{s,f}^\mu \in \{0, \ldots, N_{frame}^{slot,\mu}-1\}$ within a radio frame. One slot is configured with contiguous OFDM symbols of $N_{symb}^\mu$. $N_{symb}^\mu$ is determined based on a used numerology and a slot configuration. In a subframe, the start of a slot $n_s^\mu$ is temporally aligned with the start of OFDM symbols $n_s^\mu N_{symb}^\mu$ in the same subframe. All UEs cannot perform transmission and reception at the same time. This means that all OFDM symbols of a downlink slot or an uplink slot cannot be used. Table 2 illustrates the number of OFDM symbols ($N_{symb}^{slot}$) for each slot, the number of slots ($N_{slot}^{frame,\mu}$) for each radio frame, and the number of slots ($N_{slot}^{subframe,\mu}$) for each subframe in a normal CP. Table 3 illustrates the number of OFDM symbols for each slot, the number of slots for each radio frame, and the number of slots for each subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 is an example in which when μ=2, that is, when SCS is 60 kHz. Referring to Table B2, 1 subframe may include 4 slots. 1 subframe={1, 2, 4} slots illustrated in FIG. 3 is an example. The number of slots which may be included in 1 subframe is defined like Table 2.

Furthermore, a mini-slot may be configured 2, 4 or 7 symbols and may be configured with greater or smaller symbols.

C. Physical Resource

Figure 9:
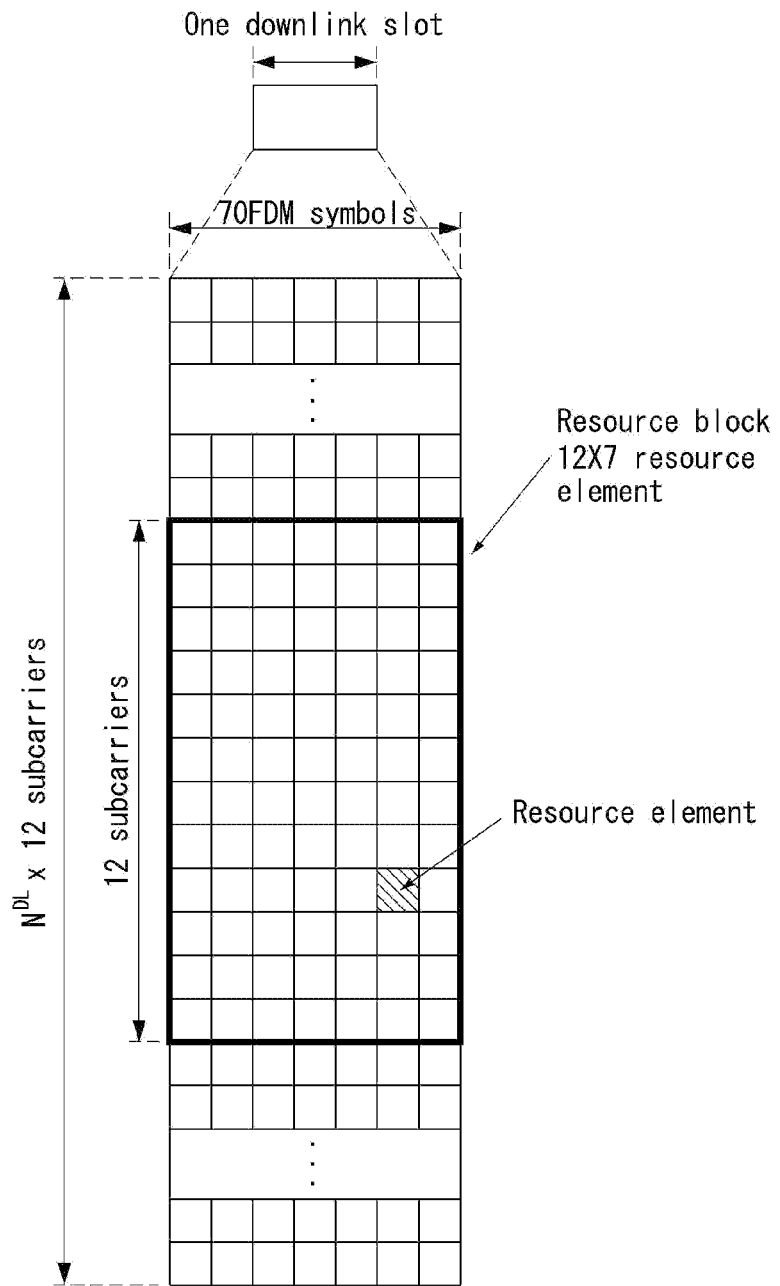
FIG. 9 illustrates a resource grid for one downlink slot.

FIG. 9 illustrates a resource grid for one downlink slot.

In FIG. 9, a downlink slot includes a plurality of OFDM symbols in the time domain. One downlink slot includes 7 OFDM symbols. One resource block (RB) includes 12 subcarriers, for example, in the frequency domain. However, the present disclosure is not limited thereto. Each element of a resource grid is called a resource element (RE). One RB includes 12×7 REs. The number of RBs included in a downlink slot depends on a downlink transmission bandwidth. The structure of an uplink slot may be the same as that of a downlink slot.

Figure 10:
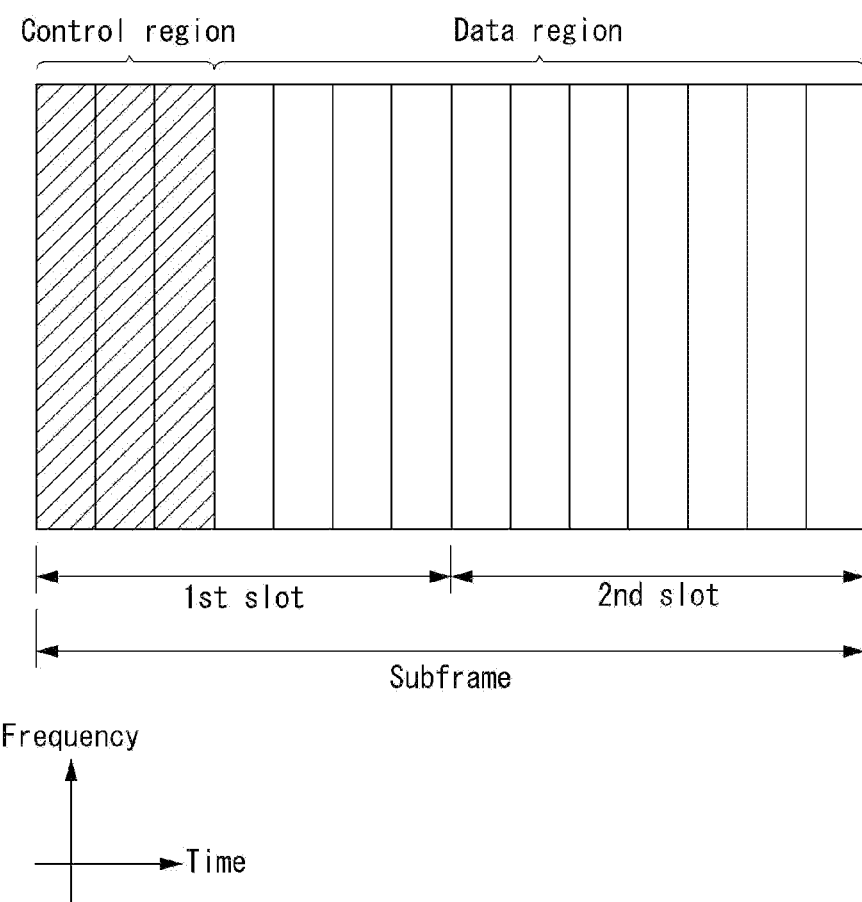
FIG. 10 illustrates the structure of a downlink subframe.

FIG. 10 illustrates the structure of a downlink subframe.

In FIG. 10, a maximum of 3 OFDM symbols located in the front part of the first slot within a subframe correspond to a control region to which control channels are allocated. The remaining OFDM symbols correspond to a data region to which a physical downlink shared chancel (PDSCH) is allocated. An example of a downlink control channel used in 3GPP LTE includes a physical control format indicator channel (PCFICH), a physical downlink control channel (PDCCH), and a physical hybrid ARQ indicator channel (PHICH). The PCFICH carries information on the number of OFDM symbols used in the transmission of a control channel in the first OFDM subframe. The PHICH is a response to uplink transmission, and carries a HARQ acknowledgement (ACK)/not-acknowledgement (NACK) signal. Control information transmitted through a PDCCH is called downlink control information (DCI). The DCI includes uplink or downlink scheduling information or includes an uplink transmission (Tx) power control command for a given UE group. The PDCCH includes the resource assignment of a downlink shared channel (DL-SCH), resource assignment information of an uplink shared channel, paging information of a paging channel (PCH), a random access response transmitted through a PDSCH, a set of transmission power control commands for individual UEs within a given UE group, a transmission power control command, and DL-SCH VoIP (Voice over IP), that is, the resource assignment of a higher layer control message such as the activation of a transmission power control command. A plurality of PDCCHs may be transmitted within the control region. A UE may monitor multiple PDCCHs. The PDCCH is transmitted as a set of one or a plurality of contiguous control channel elements (CCEs). The CCE is a logical assignment unit used to provide a PDCCH with a coding rate based on the state of a radio channel. The CCE corresponds to a plurality of resource element groups (REGs). The format of a PDCCH and the number of available bits of a PDCCH are determined based on a correlation between the number of CCEs and a coding rate provided by a CCE. A base station determines a PDCCH format based on DCI to be transmitted to a UE, and adds a cyclic redundancy check (CRC) to control information. The CRC is masked with a radio network temporary identifier (RNTI) depending on the owner of a PDCCH or the use of the PDCCH. If a PDCCH is for a specific UE, a unique identifier (e.g., cell-RNTI (C-RNTI)) of a UE may be masked with a CRC. Alternatively, if a PDCCH is for a paging message, a paging indicator identifier (e.g., paging-RNTI (P-RNTI)) may be masked with a CRC. If a PDCCH is for system information (more specifically, a system information block (SIB) to be described later), a system information identifier and system information RNTI (SI-RNTI) may be masked with a CRC. In order to indicate a random access response, that is, a response to the transmission of a random access preamble by a UE, a random access-RNTI (RA-RNTI) may be masked with a CRC.

Figure 11:
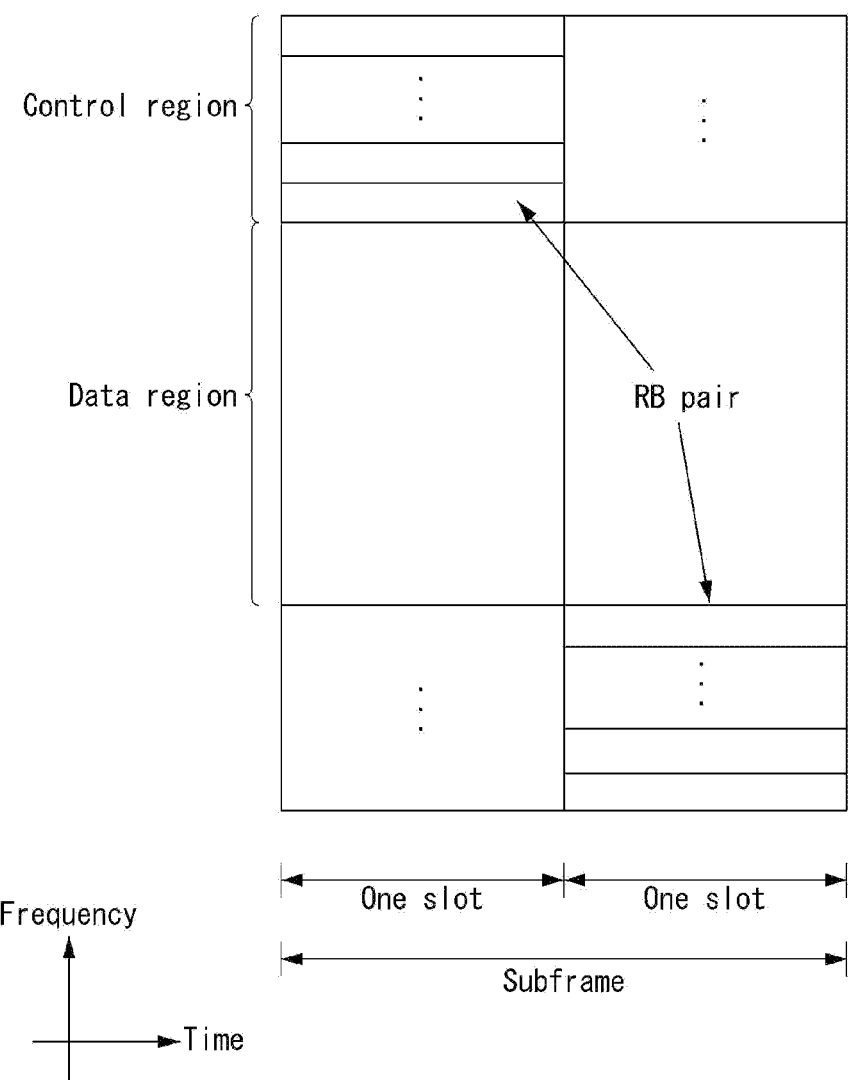
FIG. 11 illustrates the structure of an uplink subframe.

FIG. 11 illustrates the structure of an uplink subframe.

In FIG. 11, an uplink subframe may be divided into a control region and data region in the frequency domain. A physical uplink control channel (PUCCH) for carrying uplink control information is allocated to the control region. A physical uplink shared channel (PUSCH) for carrying user data is allocated to the data region. In order to maintain a single carrier characteristic, one UE does not transmit a PUCCH and a PUSCH at the same time. A PUCCH for one UE is allocated to an RB pair within a subframe. RBs belonging to an RB pair occupy different subcarriers in two slots. This is said that an RB pair allocated to a PUCCH is frequency-hopped at a slot boundary.

In relation to a physical resource in the NR system, an antenna port, a resource grid, a resource element, a resource block, and a carrier part may be taken into consideration. Hereinafter, physical resources which may be taken into consideration in the NR system are described in detail. First, in relation to an antenna port, the antenna port is defined so that a channel in which symbols on an antenna port are carried is inferred from a channel in which other symbols on the same antenna port are carried. If the large-scale property of a channel in which symbols on one antenna port are carried can be inferred from a channel in which symbols on another antenna port are carried, the two antenna ports may be said to have a quasi co-located or quasi co-location (QC/QCL) relation. In this case, the large-scale property includes one or more of delay spread, Doppler spread, a frequency shift, average received power, and received timing.

Figure 12:
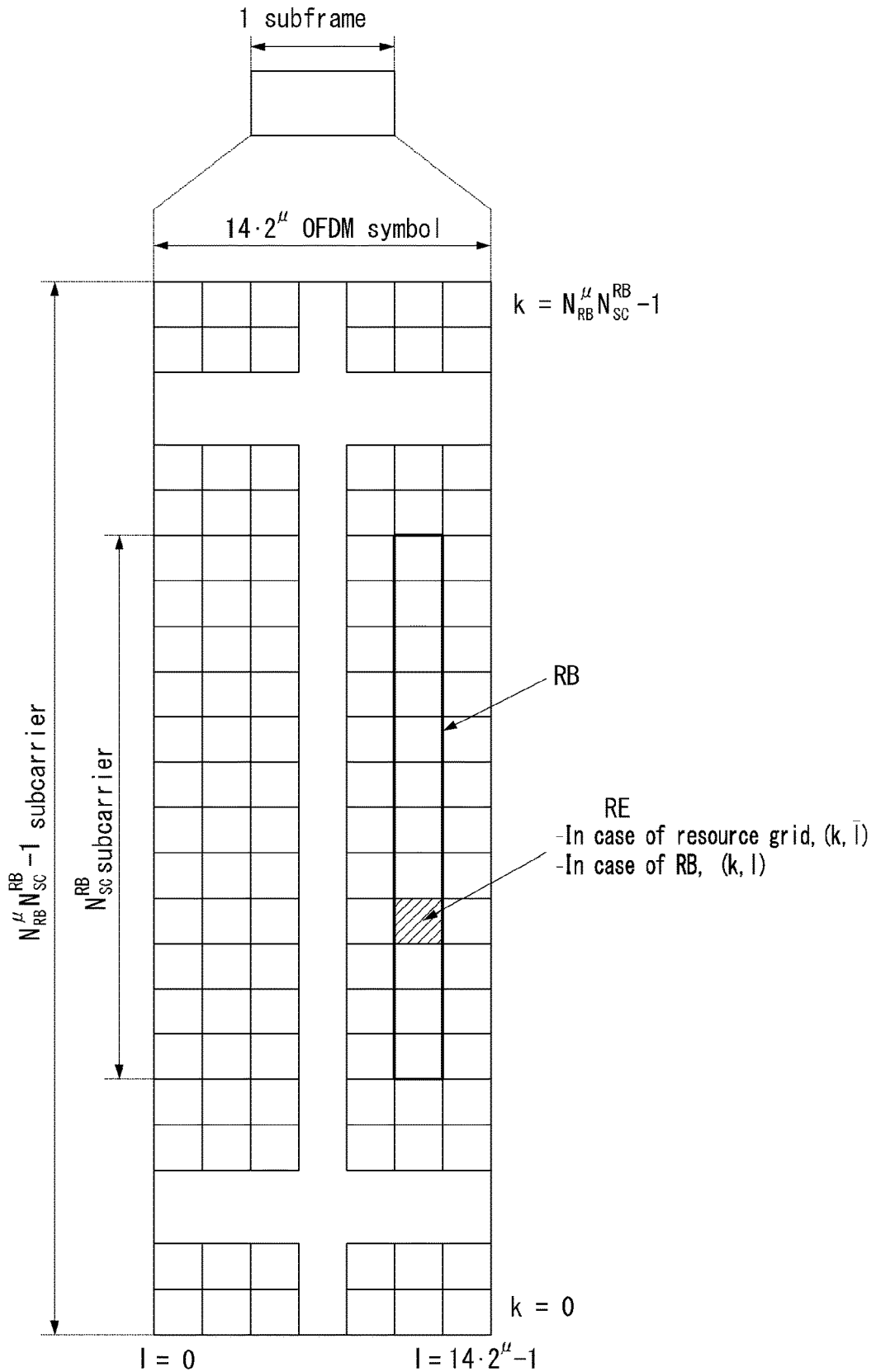
FIG. 12 illustrates an example of a resource grid in NR.

FIG. 12 illustrates an example of a resource grid in NR

Figure 13:
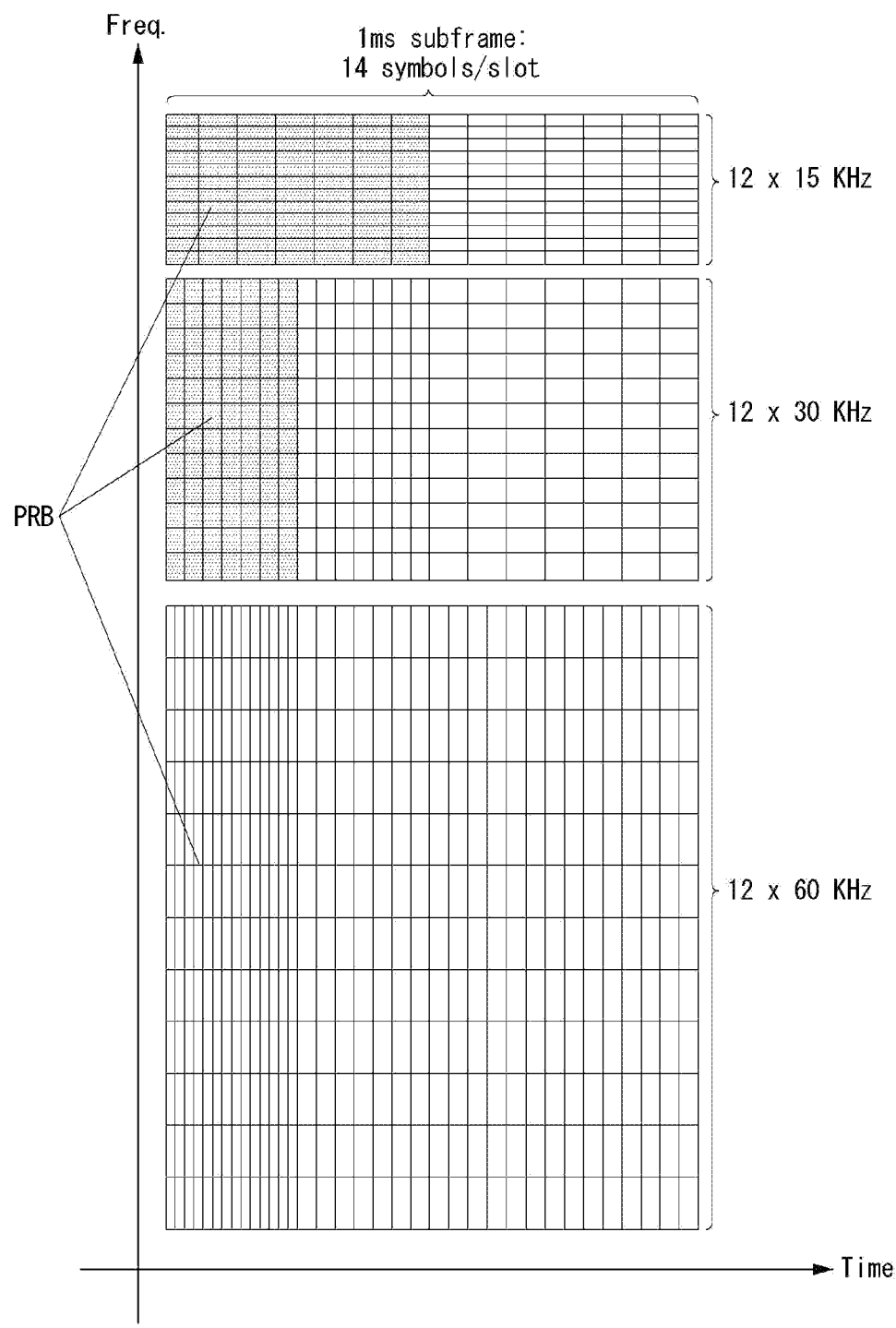
FIG. 13 is a diagram illustrating an example of a physical resource block in NR.

FIG. 13 is a diagram illustrating an example of a physical resource block in NR.

FIG. 12 illustrates that a resource grid is configured with $N_{RB}^{\mu} N_{sc}^{RB}$ subcarriers in the frequency domain and one subframe is configured with 142*μ OFDM symbols, but the present disclosure is not limited thereto. In the NR system, a transmitted signal is described by one or more resource grids configured with $N_{RB}^{\mu} N_{sc}^{RB}$ subcarriers and OFDM symbols of $2^{\mu} N_{symb}^{(\mu)}$. In this case, $N_{RB}^{\mu} < N_{RB}^{max,\mu}$. The $N_{RB}^{max,\mu}$ indicates a maximum transmission bandwidth. This may be different between the uplink and the downlink in addition to numerologies. In this case, as in C4, one resource grid may be configured for each numerology μ and antenna port p. Each element of a resource grid for the numerology μ and antenna port p is called a resource element, and is uniquely identified by an index pair (k,l̄). In this case, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ denotes the location of symbols within a subframe. When a resource element is denoted in a slot, an index pair (k,l) is used. In this case, $l=0, \ldots, N_{symb}^{\mu}-1$. A resource element (k,l̄) for a numerology μ and antenna port p corresponds to a complex value $a_{k,\bar{l}}^{(p,\mu)}$. If there is no danger of a confusion or a specific antenna port or numerology is not specified, indices p and μ may be dropped. As a result, a complex value may become $a_{k,l}^{(p,\mu)}$ or $a_{k,l}^{(p)}$. Furthermore, a resource block (RB) is defined as $N_{sc}^{RB}=12$ contiguous subcarriers in the frequency domain.

Point A functions as a common reference point of a resource block grid and is obtained as follows.

offsetToPointA for PCell downlink indicates a frequency offset between a point A and the lowest subcarrier of the lowest resource block that overlaps an SS/PBCH block used by a UE for initial cell selection, and are represented as resource block units in which a 15 kHz subcarrier spacing is assumed for an FR1 and a 60 kHz subcarrier spacing is assumed for an FR2;

absoluteFrequencyPointA illustrates the frequency-location of a point A represented as in an absolute radio-frequency channel number (ARFCN).

Common resource blocks are upward numbered from 0 in the frequency domain for a subcarrier spacing setting μ.

The center of a subcarrier 0 of a common resource block 0 for the subcarrier spacing setting μ is identical with a "point A".

In the frequency domain, a resource element (k,l) for a common resource block number $n_{CRB}$ and subcarrier spacing setting μ is given as in Equation 1.

$$n_{CRB}^{\mu} = \left\lfloor \frac{k}{N_{sc}^{AB}} \right\rfloor \qquad \text{Equation 1}$$

In this case, is relatively defined with respect to a point A so that k=0 corresponds to a subcarrier having the point A as the center.

Physical resource blocks are numbered from 0 to $N_{BWP,i}^{size}-1$ within a bandwidth part (BWP). i is the number of a BWP.

In the BWP i, a relation between a physical resource block $n_{PRB}$ and a common resource block $n_{CRB}$ is given by Equation 2.

$$n_{CRB}=n_{PRB}+N_{BWP,i}^{start} \qquad \text{Equation 2}$$

$N_{BWP,i}^{start}$ is a common resource block in which a BWP relatively starts with respect to a common resource block 0.

D. Bandwidth Part (BWP)

An NR system may be supported up to a maximum of 400 MHz per one component carrier (CC). In a UE operating in such a wideband CC, if the RF for all CCs is always turned on, UE battery consumption may increase. Alternatively, when several use cases (e.g., eMBB, URLLC, Mmtc, and V2X) operating within one wideband CC are taken into consideration, a different numerology (e.g., sub-carrier spacing) may be supported for each frequency band within a corresponding CC. Alternatively, a capability for a maximum of bandwidth may be different for each UE. By taking this into consideration, a base station may instruct a UE to operate only in some bandwidths not a full bandwidth of a wideband CC. Corresponding some bandwidths are defined as a bandwidth part (BWP) for convenience sake. The BWP may be configured with resource blocks (RB) contiguous in a frequency axis, and may correspond to one numerology (e.g., sub-carrier spacing, CP length, slot/mini-slot duration).

Meanwhile, a base station may configure multiple BWPs even within one CC configured in a UE. For example, in a PDCCH monitoring slot, a BWP occupying a relatively small frequency domain may be configured. A PDSCH indicated in a PDCCH may be scheduled on a BWP greater than the BWP. Alternatively, if UEs gather in a specific BWP, for load balancing, some UEs may be configured with other BWP. Alternatively, some spectra of a full bandwidth may be excluded and BWPs on both sides may be configured within the same slot by taking into consideration frequency domain inter-cell interference cancellation between neighboring cells. That is, a base station may configure at least one DL/UL BWP in a UE associated with a wideband CC, may activate at least one DL/UL BWP of DL/UL BWP(s) configured at specific timing (by L1 signaling or MAC CE or RRC signalling). Switching may be indicated (by L1 signaling or MAC CE or RRC signalling) by another configured DL/UL BWP. Alternatively, if a timer value expires based on a timer, switching may be performed on a predetermined DL/UL BWP. In this case, an activated DL/UL BWP is defined as an active DL/UL BWP. However, if a UE is in an initial access process or in a situation, such as before an RRC connection is set up, the UE may not receive a configuration for a DL/UL BWP. In such a situation, a DL/UL BWP assumed by the UE is defined as an initial active DL/UL BWP.

E. 3GPP Signal Transmission and Reception Method

Figure 14:
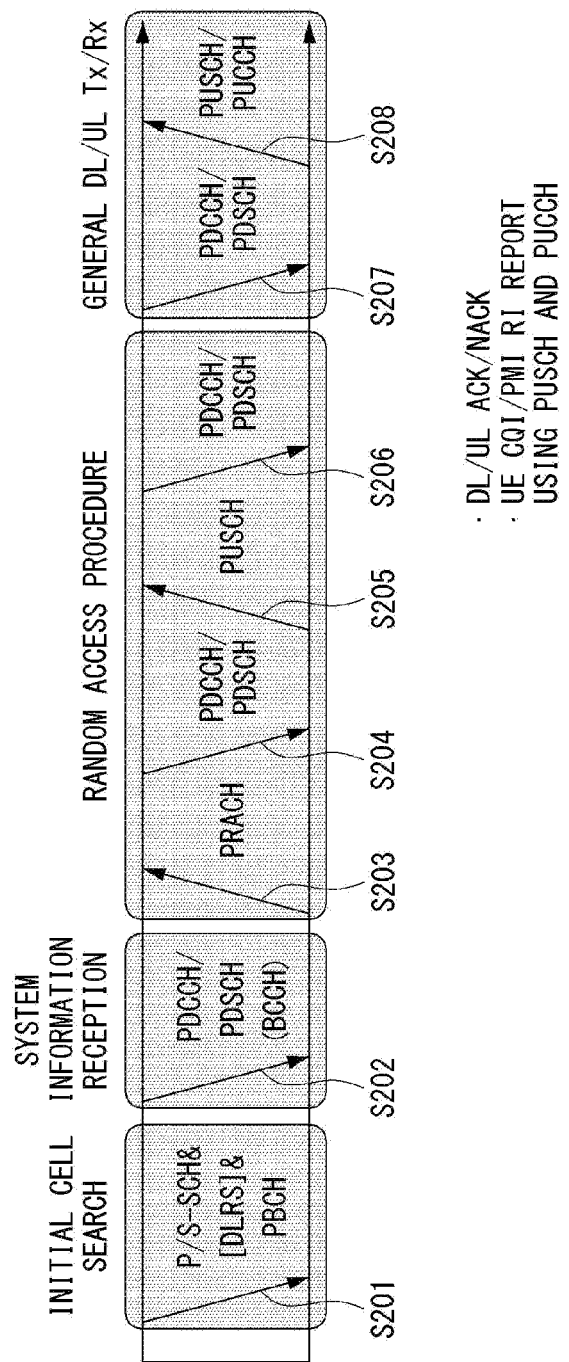
FIG. 14 is a diagram illustrating an example of a 3GPP signal transmission and reception method.

FIG. 14 is a diagram illustrating an example of a 3GPP signal transmission and reception method.

Referring to FIG. 14, when a UE is powered on or newly enters a cell, it performs an initial cell search task for synchronization with abase station (S201). To this end, the UE may receive a primary synchronization channel (P-SCH) and a secondary synchronization channel (S-SCH) from the base station, may perform synchronization with the base station, and may obtain information such as a cell ID. Thereafter, the UE may obtain broadcast information within a cell by receiving a physical broadcast channel from the base station. Meanwhile, the UE may check a downlink channel state by receiving a downlink reference signal (DL RS) in the initial cell search step.

After finishing the initial cell search, the UE may obtain more detailed system information by receiving a physical downlink control channel (PDCCH) and a physical downlink shared channel (PDSCH) based on information carried on the PDCCH (S202).

Meanwhile, if the UE first accesses the base station or there is no radio resource for signal transmission, the UE may perform a random access procedure (RACH) on the base station (step S203 to step S206). To this end, the UE may transmit a specific sequence as a preamble through a physical random access channel (RACH) (S203 and S205), and may receive a response message for the preamble through a PDSCH corresponding to the PDCCH (S204 and S206). In the case of a contention-based RACH, the UE may additionally perform a contention resolution procedure.

The UE that has performed the aforementioned procedure may receive a PDCCH/PDSCH as a common uplink/downlink signal transmission procedure (S207), and may perform physical uplink shared channel (PUSCH)/physical uplink control channel (PUCCH) transmission (S208). Particularly, the UE receives downlink control information (DCI) through the PDCCH. In this case, the DCI includes control information, such as resource assignment information for the U, and has a different format depending on its use purpose.

Meanwhile, the control information transmitted from the UE to the base station through the uplink or received by the UE from the base station includes a downlink/uplink ACK/NACK signal, a channel quality indicator (CQI), a precoding matrix index (PMI), and a rank indicator (RI). In the case of a 3GPP LTE system, a UE may transmit control information, such as the aforementioned CQI/PMI/RI, through a PUSCH and/or PUCCH.

Table 4 illustrates an example of DCI formats in the NR system.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 4, the DCI format 0_0 is used for the scheduling of a PUSCH in one cell.

Information included in the DCI format 0_0 is CRC-scrambled by a C-RNTI or a CS-RNTI or an MCS-C-RNTI and transmitted. Furthermore, the DCI format 0_1 is used to reserve a PUSCH in one cell. Information included in the DCI format 0_1 is CRC-scrambled by a C-RNTI or a CS-RNTI or an SP-CSI-RNTI or an MCS-C-RNTI and transmitted. The DCI format 1_0 is used for the scheduling of a PDSCH in one DL cell. Information included in the DCI format 1_0 is CRC-scrambled by a C-RNTI or a CS-RNTI or an MCS-C-RNTI and transmitted. The DCI format 1_1 is used for the scheduling of a PDSCH in one cell. Information included in the DCI format 1_1 is CRC-scrambled by a C-RNTI or a CS-RNTI or an MCS-C-RNTI and transmitted. The DCI format 2_1 is used to notify an PRB(s) and OFDM symbols(s) whose transmission may be assumed to be not intended by a UE.

The following information included in the DCI format 2_1 may be CRC-scrambled by an INT-RNTI and transmitted.

preemption indication 1, preemption indication 2, . . . , preemption indication N.

Embodiment of the Present Disclosure

The 5G NR standard supports a HARQ-ACK codebook using two methods of Type-1 and Type-2. The HARQ-ACK codebook methods are summarized as follows.

First, in the case of the Type-1 HARQ-ACK codebook, a HARQ-ACK codebook (a set of HARQ feedback information bits) is defined with respect to the reception of one or one or more candidate PDSCHs in which HARQ-ACK feedback information may be transmitted in a PUCCH/PUSCH which may be transmitted in a specific slot (e.g., slot #n). Although actual PDSCH transmission is not performed, bits for corresponding PDSCH reception may be defined within the HARQ-ACK codebook. If a UE recognizes that PDSCH transmission is not performed as described above (including a case where the UE fails in PDCCH detection), the UE is defined to transmit NACK. 1 bit or 2 bits may be set based on a value of "maxNrofCodeWordsScheduledByDCI", that is, a higher layer parameter that means a maximum number of codewords with respect to a single PDSCH reception occasion. In this case, if "harq-ACK-SpatialBundlingPUCCH" is configured in the UE, only 1 bit is set.

Second, in the case of the Type-2 HARQ-ACK codebook, a HARQ-ACK codebook in which HARQ-ACK feedback information may be transmitted in the same PUCCH/PUSCH is defined based on a value of a counter downlink assignment indicator (C-DAI) and total downlink assignment indicator (T-DAI) indicated in a PDCCH that is actually transmitted. That is, a HARQ-ACK codebook is configured based on PDCCH information actually transmitted to a UE. If the UE fails in specific PDCCH detection, NACK is transmitted in a bit for a corresponding PDCCH among bits defined within the HARQ-ACK codebook. In this case, whether PDCCH detection fails may be recognized by the UE through a C-DAI, T-DAI value.

Both the HARQ-ACK codebooks of the two methods were designed without taking CoMP transmission into consideration. Particularly, the Type-1 method may cause the following problems because it was designed without taking into consideration a CoMP situation in which two or more PDSCHs are transmitted in a single PDSCH reception occasion candidate. If an HARQ process number or HARQ number indicated in a UE is different in different PDCCHs, a sequence within the HARQ-ACK codebook has not been defined with respect to ACK/NACK of a PDSCH corresponding to each HARQ number. In order to support a case where two or more PDSCHs are scheduled as different HARQ numbers in a single PDSCH reception occasion candidate between a base station and a UE in which the Type-1 HARQ-ACK codebook has been configured by solving such a problem, there are proposed methods of generating a HARQ-ACK codebook (information) according to a first embodiment to a fourth embodiment below.

1. First Embodiment

If a Type-1 HARQ-ACK codebook method is configured (e.g., "pdsch-HARQ-ACK-Codebook"=semi-static) in a UE and a maximum number of codewords are set to 1 (e.g., "maxNrofCodeWordsScheduledByDCI"=1), the UE may define 2 bits for a HARQ ACK/NACK information configuration within a HARQ-ACK codebook.

Furthermore, if a maximum number of codewords are set to 2 (e.g., "maxNrofCodeWordsScheduledByDCI"=2) in a UE, the UE may define 4 bits for a HARQ ACK/NACK information configuration within a HARQ-ACK codebook.

That is, the method according to the first embodiment is the same as that a UE configures HARQ ACK/NACK information using the number of bits that is twice that of the existing method compared to CoMP transmission.

For example, this method is the same as that if a base station schedules two PDSCHs, e.g., a PDSCH #1/#2 in a UE through two PDCCHs, e.g., a PDCCH #1/#2 during overlapping time intervals, the UE semi-statically defines bits of HARQ information within a HARQ-ACK codebook for the PDSCH #1 and the PDSCH #2. The existing method and the proposed method are compared below.

For example, if the Type-1 HARQ-ACK codebook method is configured (e.g., "pdsch-HARQ-ACK-Codebook"=semi-static) in a UE and a maximum number of codewords are set to 1 (e.g., "maxNrofCodeWordsScheduledByDCI"=1), in the case of the existing method, a HARQ-ACK codebook has been configured like (B0, B1, B2) (in this case, B0, B1, and B2 different PDSCH reception occasion candidates corresponding to slots for transmitting pieces of HARQ-ACK information, respectively). In contrast, in the case of the proposed method according to the first embodiment, in a HARQ-ACK codebook, bits may be configured as twice the number of codewords like (B0-0, B0-1, B1-0, B1-1, B2-0, B2-1) (in this case, B0-0, B0-1, B1-0, B1-1, B2-0, and B2-1 are different PDSCH reception occasion candidates corresponding to slots for transmitting pieces of HARQ-ACK information, respectively).

The existing method shows an example of a HARQ-ACK codebook configuration when different three types of PDSCH reception occasion candidates are present. In this case, a UE may configure the HARQ-ACK codebook through 3 bits.

In contrast, if the proposed method according to the first embodiment is applied, a HARQ-ACK codebook is configured using 2 bits for each PDSCH reception occasion candidate by taking into consideration CoMP transmission for the three cases of PDSCH reception occasion candidates. That is, B0-0 and B0-1 are examples in which each bit has been defined in preparation for different PDSCH transmission with respect to a PDSCH reception occasion candidate corresponding to B0 in the existing method.

In this case, the PDSCH reception occasion candidate may be interpreted as a PDSCH reception occasion candidate in which ACK/NACK information may be transmitted in a corresponding the slot #n with respect to a given slot #n in which a PUCCH/PUSCH may be transmitted.

In this case, a total number of PDSCH reception occasion candidates may be different depending on a "PDSCH-to-HARQ_feedback timing indicator" indicated in a UE through a PDCCH by a base station. For example, if a HARQ feedback timing value which may be indicated in a UE through a HARQ feedback timing indicator has a total of three HARQ feedback timing values of v0, v1, and v2, a total number of PDSCH reception occasion candidates is the same as 3.

Furthermore, a HARQ feedback timing value which may be indicated in a UE through a HARQ feedback timing indicator (PDSCH-to-HARQ_feedback timing indicator) may be different depending on a transmit-receive point (TRP).

In this case, the TRP may mean a node, an antenna, an antenna port or a panel.

Furthermore, a UE may apply the method of the first embodiment to only a candidate value that overlaps between different TRPs. For example, if a PDSCH reception occasion candidate is configured as {v0, v1} for a TRP #1 and a PDSCH reception occasion candidate is configured as {v0, v1, v2} for a TRP #2, a UE determines the number and encoding sequence of ACK/NAK bits based on the proposed method with respect to {v0, v1}, that is, the overlapped PDSCH reception occasion candidate, and follows the existing method with respect to a not-overlapped PDSCH reception occasion candidate v2.

Different HARQ ACK/NACK information for a PDSCH indicated as a different HARQ number even within a single PDSCH reception occasion candidate may be defined through the proposed method. In such a case, a rule for a sequence in which bits are defined within the HARQ-ACK codebook needs to be defined. That is, in the example of the proposed method, a rule capable of notifying to which PDSCH B0-O and B0-1 correspond is necessary. The following method is proposed as such a rule.

(1) (1-1)-th Embodiment

When HARQ-ACK feedback information for a different PDSCH transmitting in a single PDSCH reception occasion candidate within a HARQ-ACK codebook is configured, a base station may directly indicate, in a UE, the sequence of bits of the HARQ feedback information within the HARQ-ACK codebook through specific field values of different PDSCHs that have scheduled different PDCCHs.

For example, a base station/UE may add a 1-bit field to a DCI format corresponding to a corresponding PDCCH, and may configure the sequence of bits of HARQ feedback information through 1 bit of the corresponding field. In this case, HARQ-ACK feedback information for a PDSCH scheduled through a PDCCH indicated by 0 may correspond to former ½ bit within a HARQ-ACK codebook, and HARQ-ACK feedback information for a PDSCH scheduled through a PDCCH indicated by 1 may correspond to ½ bit subsequently transmitted within the HARQ-ACK codebook. The opposite case is also possible. The ½ bit may be different depending on a maximum number of codewords (e.g., "maxNrofCodeWordsScheduledByDCI") configured in the UE.

For example, when bits of pieces of HARQ feedback information of a HARQ-ACK codebook is configured as (B0-0, B0-1), if a PDCCH #1 is indicated by 0 and a PDCCH #2 is indicated by 1, HARQ-ACK feedback information for a PDSCH scheduled through the PDCCH #1 may correspond to B0-0, and HARQ-ACK feedback information for a PDSCH scheduled through the PDCCH #2 may correspond to B0-1.

(2) (1-2)-th Embodiment

Alternatively, when HARQ-ACK feedback information for a different PDSCH transmitted in a single PDSCH reception occasion candidate within a HARQ-ACK codebook is configured, the sequence of bits within the HARQ-ACK codebook may be implicitly indicated by a base station based on a specific field value of a different PDCCH that has scheduled the different PDSCH.

For example, a base station may implicitly indicate, in a UE, the sequence of bits within a HARQ-ACK codebook based on a specific field value defined for DMRS port indication within a PDCCH. The sequence of bits within the HARQ-ACK codebook may correspond to ascending/descending order of a CDM group index of a DMRS port indicated through a different PDCCH that has scheduled a different PDSCH. For example, if a PDSCH #1 and PDSCH #2 have been configured as DMRS ports 1000 (e.g., CDM group #0) and 1002 (e.g., CDM group #1), HARQ-ACK feedback information for the PDSCH #1 may correspond to former ½ bit within the HARQ-ACK codebook, and HARQ-ACK feedback information for the PDSCH #2 may correspond to ½ bit subsequently transmitted within the HARQ-ACK codebook (corresponding to ascending order).

In order to define the sequence of bits within a HARQ-ACK codebook, the sequence may be implicitly indicated in a UE by a base station using not only a specific field of a PDCCH, but a higher layer parameter configured through the PDCCH.

PDSCHs transmitted at different TRPs have different PDSCH-Config setting values, and are located within a HARQ-ACK codebook bit based on a PDSCH-Config sequence corresponding to a PDSCH transmitted to a UE.

For example, a UE matches a bit for a PDSCH corresponding to the first PDSCH-Config with a former bit within a HARQ-ACK codebook, and matches a bit for a PDSCH corresponding to the second PDSCH-Config with a latter bit within the HARQ-ACK codebook.

PDSCHs transmitted at different TRPs may be indicated by PDCCHs having different PDCCH-Config setting values, and are located bits within a HARQ-ACK codebook based on a PDCCH-Config sequence in which a PDSCH is scheduled.

For example, a UE may configure a bit for a PDSCH scheduled by a PDCCH corresponding to the first PDCCH-Config in a former bit within a HARQ-ACK codebook, and may configure a bit for a PDSCH scheduled by a PDCCH corresponding to the second PDCCH-Config in a latter bit within the HARQ-ACK codebook.

PDSCHs transmitted at different TRPs may be scheduled from PDCCHs having different CORESETs (TRP/panel/ antenna/antenna port)/search spaces. A UE may locate the PDSCH in a bit within a HARQ-ACK codebook based on the sequence of a CORESET (TRP/panel/antenna/antenna port)/search space in which a PDCCH that has scheduled a PDSCH is transmitted.

A UE/base station may name a PDCCH, transmitted in a CORESET (TRP/panel/antenna/antenna port)/search space #1, as a PDCCH #1, and may name a PDCCH, transmitted in a CORESET (TRP/panel/antenna/antenna port)/search space #2, as a PDCCH #2. In this case, the UE/base station may name a PDSCH, scheduled by the PDCCH #1, as a PDSCH #1, and may name a PDSCH, scheduled by the PDCCH #2, as a PDSCH #2. In this case, the UE/base station matches a bit for the PDSCH #1 with a former bit within a HARQ-ACK codebook, and matches a bit for the PDSCH #2 with a latter bit within the HARQ-ACK codebook.

CORESETs (TRP/panel/antenna/antenna port)/search space may be configured as a kind of group. For example, the CORESET (TRP/panel/antenna/antenna port)/search space may be configured with a CORESET (TRP/panel/antenna/antenna port) group #1={CORESET #1, CORSET #2} and a CORESET (TRP/panel/antenna/antenna port) group #2={CORESET #3, CORESET #4}. Furthermore, the CORESET (TRP/panel/antenna/antenna port)/search space may be configured with a search space group #1={search space #1, search space #2} and a search space group #2={search space #3, search space #4}. In this case, a UE/base station may name, as a PDCCH #1, a PDCCH transmitted in a CORESET (TRP/panel/antenna/antenna port)/search space included in the CORESET (TRP/panel/antenna/antenna port)/search space group #1, and may name, as a PDCCH #2, a PDCCH transmitted in a CORESET (TRP/panel/antenna/antenna port)/search space included in the CORESET (TRP/panel/antenna/antenna port)/search space group #2. The UE/base station may name, as a PDSCH #1, a PDSCH scheduled by the PDCCH #1, and may name, as a PDSCH #2, a PDSCH scheduled by the PDCCH #2. In this case, the UE/base station matches a bit for the PDSCH #1 with a former bit within a HARQ-ACK codebook, and matches a bit for the PDSCH #2 with a latter bit within the HARQ-ACK codebook.

One CORESET (TRP/panel/antenna/antenna port)/search space may correspond to multiple TCI states. A PDCCH transmitted at a different TRP may correspond to a different TCI state. Each PDCCH may schedule a PDSCH transmitted at a different TRP. A bit is located within a HARQ-ACK codebook based on the sequence of TCI states to which a PDCCH that has scheduled a PDSCH corresponds.

A TCI state #1 and TCI state #2 may be configured in a CORESET (TRP/panel/antenna/antenna port) #1. A PDCCH corresponding to the TCI state #1 may be transmitted in the CORESET (TRP/panel/antenna/antenna port) #1, and may be named a PDCCH #1. A PDCCH corresponding to the TCI state #2 may also be transmitted in the CORESET (TRP/panel/antenna/antenna port) #1, and may be named a PDCCH #2. A UE/base station may name, as a PDSCH #1, a PDSCH scheduled by the PDCCH #1, and may name, as a PDSCH #2, a PDSCH scheduled by the PDCCH #2. In this case, the UE/base station matches a bit for the PDSCH #1 with a former bit within a HARQ-ACK codebook, and matches a bit for the PDSCH #2 with a latter bit within the HARQ-ACK codebook.

TCI states may be configured as a kind of group. For example, the TCI states may be configured as a TCI state group #1={TCI state #1, TCI state #2} and a TCI state group #2={TCI state #3, TCI state #4}. In this case, the UE/base station may name, as a PDCCH #1, a PDCCH corresponding to a TCI state included in the TCI state group #1, and may name, as a PDCCH #2, a PDCCH corresponding to a TCI state included in the TCI state group #2. In this case, the UE/base station may name, as a PDSCH #1, a PDSCH scheduled by the PDCCH #1, and may name, as a PDSCH #2, a PDSCH scheduled by the PDCCH #2. In this case, the UE/base station matches a bit for the PDSCH #1 with a former bit within a HARQ-ACK codebook, and matches a bit for the PDSCH #2 with a latter bit within the HARQ-ACK codebook.

If the proposed method is used, there is an advantage in that upon CoMP transmission, a different PDSCH scheduled as a different HARQ number can be transmitted in the same PUCCH through the same HARQ-ACK codebook. However, there is a disadvantage in that the number of bits necessary for HARQ-ACK codebook definition is doubled. In order to supplement such a disadvantage, whether to operate the proposed method may be configured through an information exchange between a base station and a UE, e.g., by higher layer signaling. Meanwhile, whether to operate the proposed method may be configured through an information exchange between a base station and a UE. However, if the proposed method is configured to operate, twice bits are necessary for all PDSCH reception occasion candidates. The following (1-3)-th embodiment method is proposed to reduce the number of bits necessary for a situation in which the number of bits is increased as described above.

(3) (1-3)-th Embodiment

If a base station schedules, in a UE, PDSCHs having different HARQ numbers during overlapped time intervals through different PDCCHs, a feedback timing value of HARQ-ACK feedback information for a corresponding PDSCH may be fixedly set as a specific slot (time).

The disadvantage in the first embodiment is that the number of bits for defining HARQ-ACK feedback information for all PDSCH reception occasion candidates is doubled. If the number of bits for defining HARQ-ACK feedback information can be limited to a specific PDSCH reception occasion not all PDSCH reception occasion candidates, the amount that the number of bits increases can be reduced. As a method capable of restricting, to a specific PDSCH reception occasion, PDSCH reception occasions that double the number of bits as described above, a feedback timing value of HARQ-ACK feedback information is fixed to a specific slot in the case of CoMP transmission in which cooperation transmission is performed in two or more nodes (multi-point). In such a case, a base station and a UE define a HARQ-ACK codebook by taking into consideration CoMP transmission with respect to only a PDSCH reception occasion corresponding to a specific slot. Accordingly, overhead for HARQ-ACK codebook definition can be reduced.

If candidate values (slot) of HARQ feedback timing which may be indicated based on a "PDSCH-to-HARQ_feedback timing indicator" within a PDCCH between a base station and a UE include at total of three candidate values of v0, v1, and v2, HARQ-ACK feedback is configured to be performed through the v1 (first slot) value in the case of CoMP transmission.

As described above, if feedback timing for HARQ-ACK feedback is set as a specific value (slot) upon CoMP transmission between a base station and a UE, HARQ-ACK codebook definition can be simplified as follows.

An example of a HARQ-ACK codebook which may be transmitted in a first slot defined based on the proposed method (B0, B1-0, B1-1, B2).

In the case of the existing method, a HARQ-ACK codebook is defined using (B0-0, B0-1, B1-0, B1-1, B2-0, B2-1) because CoMP transmission for all PDSCH reception occasion candidates is taken into consideration. In contrast, the method according to the (1-3)-th embodiment has an advantage in that the number of bits necessary to define a HARQ-ACK codebook is reduced because HARQ feedback information for a plurality of PDSCHs has only to be transmitted with respect to only a specific PDSCH reception occasion.

In the proposal, a feedback timing value of HARQ-ACK feedback information may be a fixed value agreed between a base station and a UE or may be set as a specific slot (time) through an information exchange (e.g., through higher layer signaling) between the base station and the UE.

Furthermore, the feedback timing value may be set as one specific fixed value or may be defined as a small number of candidate values.

(4) (1-4)-th Embodiment

In the first embodiment and the (1-1)-th embodiment to (1-3)-th embodiment, it has been assumed that the configuration of a bit within a HARQ-ACK codebook is extended within the same PDSCH reception occasion candidate. That is, it has been assumed that HARQ-ACK feedback information bits for a PDSCH #1 and PDSCH #2 which may be transmitted in the same PDSCH reception occasion candidate are contiguously configured. Such a configuration method may be one example. For another example, a UE may configure a HARQ-ACK codebook for all PDSCH reception occasion candidates with respect to a PDSCH #1, may configure a HARQ-ACK codebook for all PDSCH reception occasion candidates with respect to a PDSCH #2, and may then concatenate the two HARQ-ACK codebooks. The following example shows a difference between the two methods.

As an example in which HARQ-ACK feedback information bits for a PDSCH #1 and PDSCH #2 which may be transmitted in the same PDSCH reception occasion candidate are concatenated and configured, a HARQ-ACK codebook may be (B0-0, B0-1, B1-0, B1-1, B2-0, B2-1).

In this case, as an example in which a HARQ-ACK codebook for all PDSCH reception occasion candidates is configured with respect to the PDSCH #1, a HARQ-ACK codebook for all the PDSCH reception occasion candidates is configured with respect to the PDSCH #2, and the two HARQ-ACK codebooks are concatenated, the HARQ-ACK codebook may be configured like (B0-0, B1-0, B2-0, B0-1, B1-1, B2-1).

Such a method is possible in all of the first embodiment and the subsequent first embodiment to third embodiment thereof. In this case, in the proposal, a method of concatenating HARQ-ACK codebooks based on that HARQ-ACK codebooks for different PDSCH #1 and PDSCH #2 which may be transmitted in the same PDSCH reception occasion candidate can be defined is not limited to the above example.

For example, it is evident that such a method may be identically applied to a newly added embodiment.

Meanwhile, in the first embodiment and the subsequent (1-1)-th embodiment to (1-4)-th embodiment thereof, a case where a HARQ process number (HARQ number) indicated in a UE in a different PDCCH is different has been assumed, but the embodiments may also be applied to a case where the HARQ process number (HARQ number) is configured as the same HARQ number.

Meanwhile, if a maximum number of codewords configured in a UE is 2, a HARQ-ACK codebook needs to be configured as a total of 4 bits when CoMP transmission is taken into consideration because HARQ-ACK feedback information is defined as 2 bits with respect to one PDSCH transmission. 2 bits of 4 bits are always discarded because transmission will be performed using 1 codeword in each PDSCH when actual CoMP transmission is performed. Accordingly, efficiency is degraded.

As a method capable of supplementing such a disadvantage, a HARQ-ACK codebook may be defined without an additional bit by configuring a different PDSCH, scheduled by a different PDCCH, as the same HARQ number. Such a configuration method may be different depending on a maximum number of codewords configured in a UE. A detailed method is described in the following second embodiment 2. Second Embodiment In a case where a Type-1 HARQ-ACK codebook method is configured (e.g., "pdsch-HARQ-ACK-Codebook"=semi-static) in a UE and a maximum number of codewords are set to 1 (e.g., "maxNrofCodeWordsScheduledByDCI"=1), if the UE recognizes that different PDSCHs having the same HARQ number are based on a CoMP operation, a bit within a HARQ-ACK codebook may correspond to HARQ-ACK feedback information for the reception of two or more different PDSCHs. In this case, corresponding 1-bit information corresponds to 1-bit information generated by the UE through a binary AND operation.

In the proposal, "the UE recognizes that different PDSCHs are based on a CoMP operation" may be interpreted as being the same as that the UE recognizes that different PDSCHs are transmitted in different TRP/panels.

For example, different nodes (TRPs/panels) may be recognized based on QCL information configured in a UE. For example, if multiple RS sets having different QCL information are configured through TCI-State, a UE may recognize that PDSCHs are transmitted from different TRPs/panels.

For another example, if different QCL information having the same QCL type is configured in a UE, the UE may recognize that the different QCL information is based on a CoMP operation.

In the second embodiment, it has been assumed that a UE recognizes that different PDSCHs are based on a CoMP operation and such an example has been described above, but only the example is not proposed. It is evident that the proposed method may be applied to a case where a UE recognizes a CoMP operation using a method not described in the example.

If the proposed method is used, the problem of the existing method of setting a maximum number of codewords to 1 and transmitting only HARQ-ACK feedback information 1-bit information for one PDSCH generated as a single codeword within a HARQ-ACK codebook is solved. Accordingly, HARQ-ACK feedback information for two or more multiple PDSCHs can be transmitted using 1-bit information. As an example of a binary AND operation, the binary AND operation may correspond to 1 if both a PDSCH #1 and a PDSCH #2 are well received, and may correspond to 0 if the reception of any one of the PDSCH #1 and PDSCH #2 fails.

If different PDSCHs are scheduled by different PDCCHs in the proposed method, when the detection of a specific PDCCH fails, HARQ-ACK feedback information for a corresponding PDSCH may be assumed to be NACK. Such a rule may be applied to a method according to the following third embodiment.

3. Third Embodiment

In a case where a Type-1 HARQ-ACK codebook method is configured (e.g., "pdsch-HARQ-ACK-Codebook"=semi-static) in a UE and a maximum number of codewords are set to 2 (e.g., "maxNrofCodeWordsScheduledByDCI"=2), if the UE recognizes that different PDSCHs having the same HARQ number are based on a CoMP operation, 2 bits within the HARQ-ACK codebook may correspond to HARQ-ACK feedback information for the reception of two or more different PDSCHs, respectively. In this case, a rule for matching a specific bit of the 2 bits with specific PDSCH transmission may be applied to methods according to a (3-1)-th embodiment to (3-2)-th embodiment.

(1) (3-1)-th Embodiment

The first/second bit within the HARQ-ACK codebook may be directly indicated through a specific field value of a different PDCCH that has scheduled a different PDSCH.

For example, a 1 bit field may be added to a DCI format corresponding to a corresponding PDCCH. In this case, HARQ-ACK feedback information for a PDSCH scheduled through a PDCCH indicated by 0 may correspond to the first bit within the HARQ-ACK codebook, and HARQ-ACK feedback information for a PDSCH scheduled through a PDCCH indicated by 1 may correspond to the second bit within the HARQ-ACK codebook, and vice versa.

(2) (3-2)-th Embodiment

Alternatively, in which one of the first/second bits within a HARQ-ACK codebook will HARQ feedback information for a PDSCH be configured may be implicitly indicated based on a specific field value of a different PDCCH that has scheduled a different PDSCH.

For example, a relation between HARQ feedback information and a bit within a HARQ-ACK codebook may be implicitly indicated based on a specific field value defined for DMRS port indication within a PDCCH. A relation between the first/second bits within a HARQ-ACK codebook and HARQ feedback information may be indicated in ascending/descending order of CDM group indices of DMRS ports indicated through different PDCCHs that have scheduled different PDSCHs. For example, if a PDSCH #1 and a PDSCH #2 have been configured as DMRS ports 1000 (e.g., CDM group #0) and 1002 (e.g., CDM group #1), respectively, HARQ-ACK feedback information for the PDSCH #1 may correspond to the first bit within a HARQ-ACK codebook, and HARQ-ACK feedback information for the PDSCH #2 may correspond to the second bit within the HARQ-ACK codebook (corresponding to the case of ascending order).

In order to define the sequence of bits within the HARQ-ACK codebook, the sequence of bits may be implicitly indicated using a higher layer parameter configured in a UE in addition to a specific field of a PDCCH.

PDSCHs transmitted at different TRPs have different PDSCH-Config setting values. A UE locates a bit within a HARQ-ACK codebook based on a PDSCH-Config sequence corresponding to a PDSCH transmitted to the UE.

A UE matches a bit for a PDSCH, corresponding to the first PDSCH-Config, with a former bit within a HARQ-ACK codebook, and matches a bit for a PDSCH, corresponding to the second PDSCH-Config, with a latter bit within the HARQ-ACK codebook.

PDSCHs transmitted at different TRPs may be indicated from PDCCHs having different PDCCH-Config setting values. A UE locates a bit within a HARQ-ACK codebook based on a PDCCH-Config sequence in which a PDSCH is scheduled.

A UE matches a bit for a PDSCH, scheduled by a PDCCH corresponding to the first PDCCH-Config, with a former bit within a HARQ-ACK codebook, and matches a bit for a PDSCH, scheduled by a PDCCH corresponding to the second PDCCH-Config, with a latter bit within the HARQ-ACK codebook.

PDSCHs transmitted at different TRPs may be scheduled from PDCCHs of different CORESETs (TRP/panel/antenna/antenna port)/search spaces. A UE locates a bit within a HARQ-ACK codebook based on the sequence of CORESETs (TRP/panel/antenna/antenna port)/search spaces in which a PDCCH that has scheduled a PDSCH is transmitted.

A UE may name, as a PDCCH #1, a PDCCH transmitted in a CORESET (TRP/panel/antenna/antenna port)/search space #1, and may name, as a PDCCH #2, a PDCCH transmitted in a CORESET (TRP/panel/antenna/antenna port)/search space #2. In this case, the UE may name, as a PDSCH #1, a PDSCH scheduled by the PDCCH #1, and may name, as a PDSCH #2, a PDSCH scheduled by the PDCCH #2. In this case, the UE matches a bit for the PDSCH #1 with a former bit within a HARQ-ACK codebook and matches a bit for the PDSCH #2 with a latter bit within the HARQ-ACK codebook.

CORESETs (TRP/panel/antenna/antenna port)/search spaces may be configured as a kind of group. For example, the CORESETs (TRP/panel/antenna/antenna port)/search spaces may be configured as a CORESET (TRP/panel/antenna/antenna port)/search space group #1={CORESET #1, CORSET #2} and a CORESET (TRP/panel/antenna/antenna port) group #2={CORESET #3, CORESET #4}. Furthermore, CORESETs (TRP/panel/antenna/antenna port)/search spaces may be configured as a search space group #1={search space #1, search space #2} and a search space group #2={search space #3, search space #4}. In this case, a UE may name, as a PDCCH #1, a PDCCH transmitted in a CORESET (TRP/panel/antenna/antenna port)/search space included in the CORESET (TRP/panel/antenna/antenna port) group #1/search space group #1, and may name, as a PDCCH #2, a PDCCH transmitted in a CORESET (TRP/panel/antenna/antenna port)/search space included in the CORESET (TRP/panel/antenna/antenna port) group #2/search space group #2. The UE may name, as a PDSCH #1, a PDSCH scheduled by the PDCCH #1, and may name, as a PDSCH #2, a PDSCH scheduled by the PDCCH #2. In this case, the UE matches a bit for the PDSCH #1 with a former bit within a HARQ-ACK codebook, and matches a bit for the PDSCH #2 with a latter bit within the HARQ-ACK codebook.

One CORESET (TRP/panel/antenna/antenna port) may correspond to multiple TCI states. PDCCHs transmitted at different TRPs may correspond to different TCI states, respectively. The PDCCHs may schedule PDSCHs transmitted at different TRPs. Bits within a HARQ-ACK codebook are located based on the sequence of TCI states to which the PDCCHs that have scheduled the PDSCHs correspond.

A TCI state #1 and TCI state #2 may be configured in a CORESET (TRP/panel/antenna/antenna port) #1. A PDCCH corresponding to the TCI state #1 may be transmitted in the CORESET (TRP/panel/antenna/antenna port) #1, and may be named a PDCCH #1. A PDCCH corresponding to the TCI state #2 may be transmitted in a CORESET (TRP/panel/antenna/antenna port) #1, and may be named a PDCCH #2. A PDSCH scheduled by the PDCCH #1 may be named a PDSCH #1, and a PDSCH scheduled by the PDCCH #2 may be named a PDSCH #2. In this case, a bit for the PDSCH #1 is matched with a former bit within a HARQ-ACK codebook, and a bit for the PDSCH #2 is matched with a latter bit within HARQ-ACK codebook.

TCI states may be configured as a kind of group. For example, TCI states may be configured as a TC state group #1={TCI state #1, TCI state #2} and a TC state group #2={TCI state #3, TCI state #4}. In this case, a UE may name, as a PDCCH #1, a PDCCH corresponding to a TCI state included in the TCI state group #1, and may name, as a PDCCH #2, a PDCCH corresponding to a TCI state included in the TCI state group #2. In this case, the UE may name, as a PDSCH #1, a PDSCH scheduled by the PDCCH #1, and may name, as a PDSCH #2, a PDSCH scheduled by the PDCCH #2. In this case, the UE matches a bit for the PDSCH #1 with a former bit within a HARQ-ACK codebook, and matches a bit for the PDSCH #2 with a latter bit within the HARQ-ACK codebook.

In the second embodiment and the third embodiment, the Type-1 HARQ-ACK codebook method has been assumed. However, in order to reduce the number of bits for HARQ-ACK codebook definition, the Type-2 method may also be applied. For example, if the Type-2 HARQ-ACK codebook method is configured (e.g., "pdsch-HARQ-ACK-Codebook"=dynamic) in a UE and a C-DAI, a T-DAI and HARQ feedback timing indicated in different PDCCHs are the same, a base station and the UE may generate a HARQ-ACK codebook based on the second embodiment and the third embodiment.

In this case, in order to obviate ambiguity between C-DAI and T-DAI values, different PDCCHs may be limited to be transmitted at the same timing.

Meanwhile, the first embodiment to the third embodiment and the subsequently proposed (1-1)-th embodiment to (1-4)-th embodiment and (3-1)-th embodiment to (3-2)-th embodiment may be more preferred compared to a case where a HARQ number corresponding to each PDSCH is set as the same HARQ number or a different HARQ number based on a dynamic information exchange between TRPs when different PDSCHs are transmitted based on a CoMP operation.

The reason for this is that different PDSCHs may be separated based on codeword indices in the case of the same HARQ number and different PDSCHs may be separated through HARQ numbers in the case of different HARQ numbers. This may be possible in the situation which a TRP is connected using an ideal backhaul or a backhaul having very low delay.

In contrast, if a non-ideal backhaul having relatively great delay between TRPs is taken into consideration, a HARQ number cannot be set by dynamically adjusting it between the TRPs. In such a case, if different PDSCHs correspond to the same HARQ number, a problem occurs in data decoding because a UE recognizes different data as the same data due to the same HARQ number although the different data are actually transmitted.

Accordingly, in such a case, a rule capable of preventing the same HARQ number from being configured between different PDSCHs transmitted at different TRPs is necessary. This is described through the following fourth embodiment.

4. Fourth Embodiment

Different TRPs capable of transmitting data to the same UE may be configured with a set of non-overlapped HARQ numbers. Each of the TRPs set, in the UE, a specific value among IDs within the corresponding set. The UE may expect that HARQ numbers corresponding to respective PDSCHs are different when different PDSCHs are transmitted at different TRPs.

If the range of a total of HARQ numbers that may be set is 0-15, sets configured with even IDs/odd IDs may be configured in TRPs #1/#2, respectively.

TRP #1: 0, 2, 4, 6, 8, 10, 12, 14
TRP #2: 1, 3, 5, 7, 9, 11, 13, 15

Each TRP schedules a different PDSCH in a UE through a PDCCH. In this case, a HARQ number corresponding to each PDSCH may be set as a specific value among the set.

A UE may configure whether to operate the method according to the fourth embodiment through an information exchange between a base station and the UE, for example, through higher layer signaling.

The "when different PDSCHs are transmitted at different TRPs" may mean the time based on a CoMP operation with respect to the different PDSCHs. In this case, for example, a UE may recognize a different TRP/panel based on QCL information configured in the UE. For example, if multiple RS sets having different QCL information are configured through TCI-State, a UE may recognize that PDSCHs are transmitted from different TRPs/panels. For another example, if different QCL information having the same QCL type is configured in a UE, the UE may recognize that different TRPs/panels are based on a CoMP operation.

In the fourth embodiment, the time when different PDSCHs are transmitted at different TRPs has been assumed. Although such an example has been described, the fourth embodiment is not proposed as the example.

It is evident that the proposed method may also be applied to a case where a UE recognizes that different PDSCHs are transmitted at different TRPs using a method not described in the example.

In the proposals of the first embodiment to the fourth embodiment, the following contents may also be taken into consideration. A base station may designate a CORESET (TRP/panel/antenna/antenna port)/Search space/TCI group in a UE. If only one CORESET (TRP/panel/antenna/antenna port)/search space/TCI of a plurality of CORESETs (TRP/panel/antenna/antenna port)/search spaces/TCIs configured in the UE corresponds to a TRP 2 and the remaining CORESETs (TRP/panel/antenna/antenna port)/search spaces/TCIs correspond to a TRP 1, the base station can perform grouping by classifying one CORESET (TRP/panel/antenna/antenna port)/search space/TCI corresponding to the TRP 2 and indicating it in the UE.

Furthermore, the base station may not directly classify and indicate one CORESET (TRP/panel/antenna/antenna port)/search space/TCI corresponding to the TRP 2, which may be checked by the UE based on an agreed rule. For example, the base station/UE has agreed that the smallest/ greatest of IDs (/indices) of a CORESET (TRP/panel/antenna/antenna port)/search space/TCI corresponds to the TRP 2.

UE/Base Station Operation of the Present Disclosure

Figure 15:
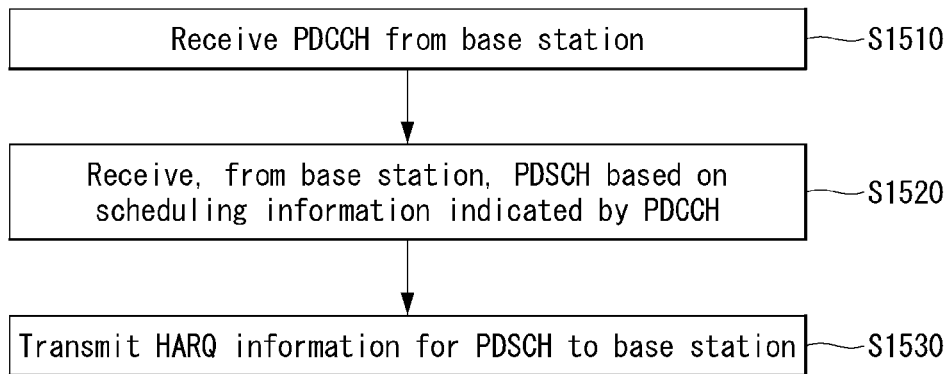
FIG. 15 is a flowchart illustrating a HARQ-ACK-related operation of a UE according to an embodiment of the present disclosure.

FIG. 15 is a flowchart illustrating a HARQ-ACK-related operation of a UE according to an embodiment of the present disclosure.

As illustrated in FIG. 15, first, a UE may receive a PDCCH from a base station (node) (S1510).

Next, the UE may receive, from the base station, a PDSCH based on scheduling information indicated by the PDCCH (S1520).

Finally, the UE may transmit, to the base station, HARQ feedback information for the PDSCH (S1530).

Specifically, the UE may receive a first PDCCH and a second PDCCH from a first transmission node and a second transmission node, respectively. Next, the UE may receive, from the first transmission node and the second transmission node, a PDSCH and second PDSCH respectively scheduled by the first PDCCH and the second PDCCH. Next, the UE may determine the type of HARQ-ACK codebook for the first PDSCH and the second PDSCH. Next, the UE may transmit HARQ feedback information for the determined HARQ-ACK codebook. In this case, the first PDCCH and the second PDCCH include specific HARQ feedback timing information used for a CoMP. If a reception occasion for the first PDSCH and a reception occasion for the second PDSCH overlap, the HARQ feedback information may be transmitted on a slot corresponding to a value indicated by specific HARQ feedback timing information.

Figure 16:
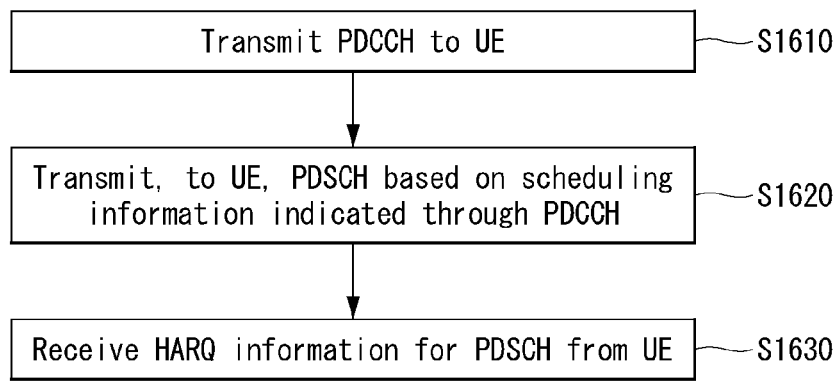
FIG. 16 is a flowchart illustrating a HARQ-ACK-related operation of a base station according to an embodiment of the present disclosure.

FIG. 16 is a flowchart illustrating a HARQ-ACK-related operation of a base station according to an embodiment of the present disclosure.

As illustrated in FIG. 16, first, a base station may transmit a PDCCH to a UE (S1610).

Next, the base station may transmit a PDSCH to the UE based on scheduling information indicated through the PDCCH (S1620).

Finally, the base station may receive HARQ feedback information for the PDSCH from the UE (S1630).

General Apparatus to which the Present Disclosure May be Applied

Figure 17:
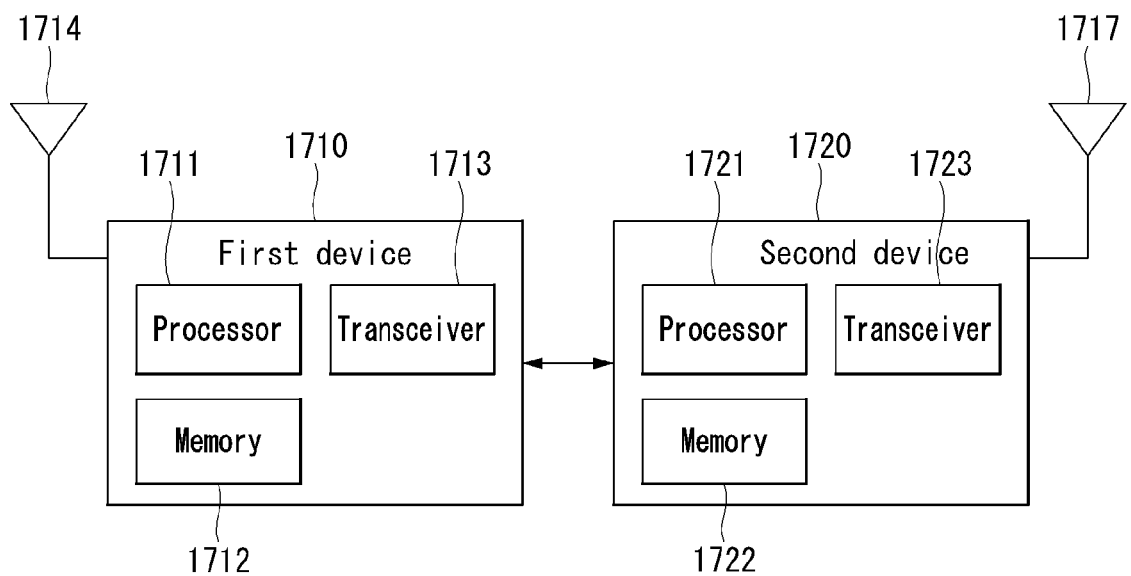
FIG. 17 illustrates a wireless communication device according to an embodiment of the present disclosure.

FIG. 17 illustrates a wireless communication device according to an embodiment of the present disclosure.

Referring to FIG. 17, a wireless communication system may include a first device 1710 and a second device 1720.

The first device 1710 may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 1720 may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 1710 may include at least one processor such as a processor 1711, at least one piece of memory such as memory 1712, and at least one transceiver such as a transceiver 1713. The processor 1711 may perform the above-described functions, procedures, and/or methods. The processor 1711 may perform one or more protocols. For example, the processor 1711 may perform one or more layers of a radio interface protocol. The memory 1712 is connected to the processor 1711, and may store various forms of information and/or instructions. The transceiver 1713 is connected to the processor 1711, and may be controlled to transmit and receive radio signals.

The second device 1720 may include at least one processor such as a processor 1721, at least one piece of memory device such as memory 1722, and at least one transceiver such as a transceiver 1723. The processor 1721 may perform the above-described functions, procedures and/or methods. The processor 1721 may implement one or more protocols. For example, the processor 1721 may implement one or more layers of a radio interface protocol. The memory 1722 is connected to the processor 1721, and may store various forms of information and/or instructions. The transceiver 1723 is connected to the processor 1721 and may be controlled transmit and receive radio signals.

The memory 1712 and/or the memory 1722 may be connected inside or outside the processor 1711 and/or the processor 1721, respectively, and may be connected to another processor through various technologies, such as a wired or wireless connection.

The first device 1710 and/or the second device 1720 may have one or more antennas. For example, the antenna 1714 and/or the antenna 1724 may be configured to transmit and receive radio signals.

Figure 18:
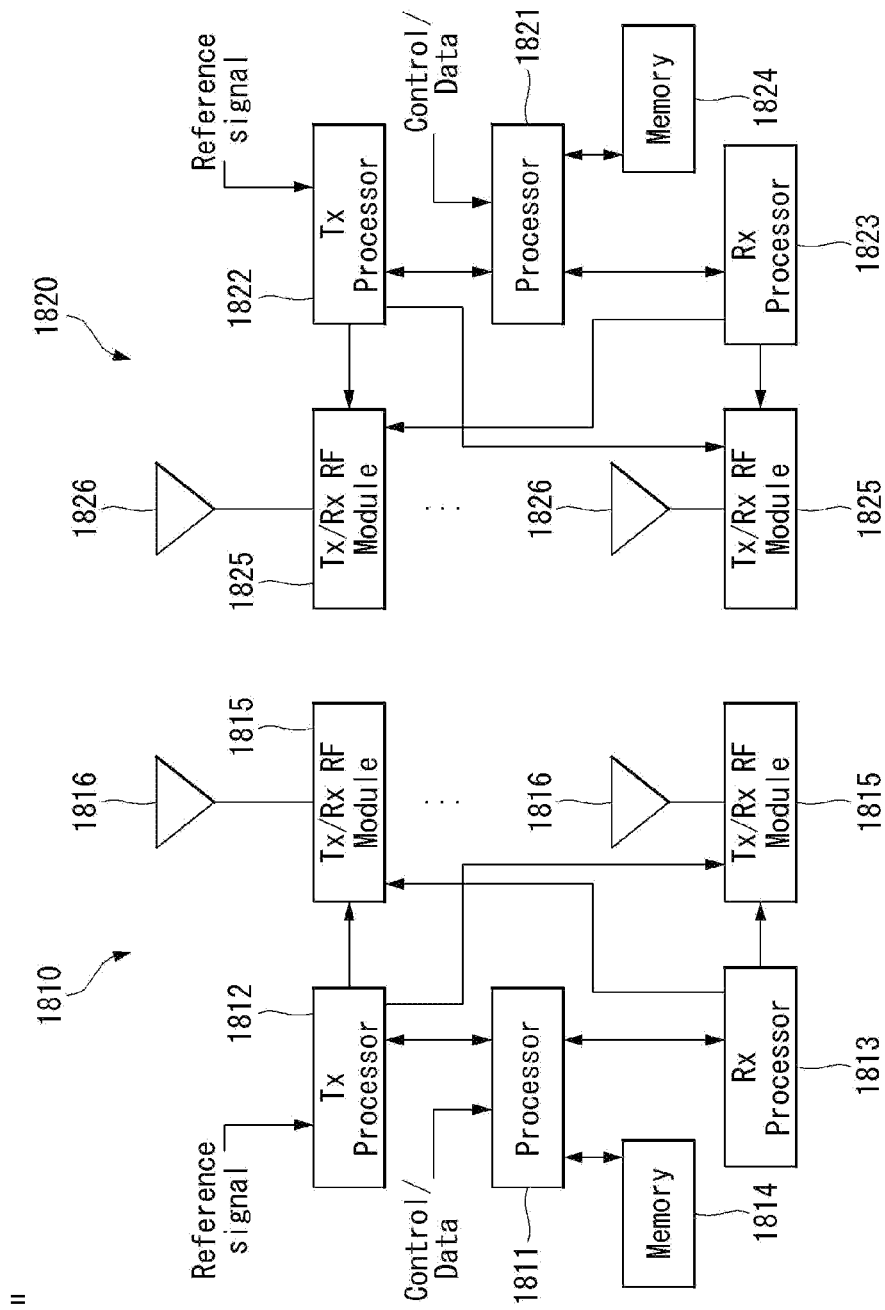
FIG. 18 is another example of a block diagram of a wireless communication device to which methods proposed in the present disclosure may be applied.

FIG. 18 is another example of a block diagram of a wireless communication device to which methods proposed in the present disclosure may be applied.

Referring to FIG. 18, a wireless communication system includes a base station 1810 and multiple UEs 1820 disposed within the base station region. The base station may be represented as a transmission device, and the UE may be represented as a reception device, and vice versa. The base station and the UE include processors 1811 and 1821, memories 1814 and 1824, one or more Tx/Rx radio frequency (RF) modules 1815 and 1825, Tx processors 1812 and 1822, Rx processors 1813 and 1823, and antennas 1816 and 1826, respectively. The processor implements the above-described functions, processes and/or methods. More specifically, in DL (communication from the base station to the UE), a higher layer packet from a core network is provided to the processor 1811. The processor implements the function of the L2 layer. In DL, the processor provides the UE 1820 with multiplexing between a logical channel and a transport channel and radio resource allocation, and is responsible for signaling toward the UE. The TX processor 1812 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 1816 through an individual Tx/Rx module (or transmitter and receiver 1815). Each Tx/Rx module may modulate an RF carrier into each space stream for transmission. In the UE, each Tx/Rx module (or transmitter and receiver 1825) receives a signal through each antenna 1826 of each Tx/Rx module. Each Tx/Rx module restores information modulated in an RF carrier and provides it to the RX processor 1823. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 1821.

UL (communication from the UE to the base station) is processed by the base station 1810 in a manner similar to that described in relation to the receiver function in the UE 1820. Each Tx/Rx module 1825 receives a signal through each antenna 1826. Each Tx/Rx module provides an RF carrier and information to the RX processor 1823. The processor 1821 may be related to the memory 1824 storing a program code and data. The memory may be referred to as a computer-readable medium.

Example of a Communication System to which the Present Disclosure is Applied

Figure 19:
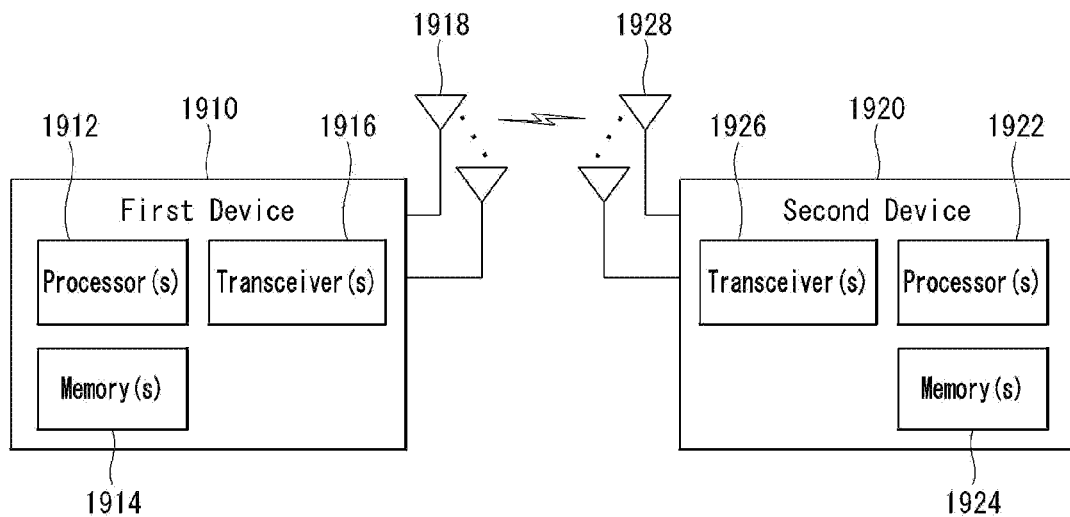
FIG. 19 is an example of a wireless device which may be applied to the present disclosure.

FIG. 19 is an example of a wireless device which may be applied to the present disclosure.

Referring to FIG. 19, a first wireless device 1910 and a second wireless device 1920 may transmit and receive radio signals through various radio access technologies (e.g., e.g. LTE or NR). In this case, {first wireless device 1910, second wireless device 1920} may correspond to {UE 1820, base station 1820} and/or {wireless device 1810, wireless device 1820} in FIG. 18.

The first wireless device 1910 includes one or more processors 1912 and one or more memories 1914. Additionally, the first wireless device 1910 may further include one or more transceivers 1916 and/or one or more antennas 1918. The processor 1912 may be configured to control the memory 1914 and/or the transceiver 1916 and to implement the descriptions, functions, procedures, proposals, methods and/or operational flowcharts disclosed in this document. For example, the processor 1912 may generate a first information/signal by processing information within the memory 1914, and may transmit a radio signal including the first information/signal through the transceiver 1916. Furthermore, the processor 1912 may receive a radio signal including a second information/signal through the transceiver 1916, and may store, in the memory 1914, information obtained from the signal processing of the second information/signal. The memory 1914 may be connected to the processor 1912 and may store various pieces of information related to an operation of the processor 1912. For example, the memory 1914 may store a software code including instructions for performing some of or all processes controlled by the processor 1912 or performing the descriptions, functions, procedures, proposals, methods and/or operational flowcharts disclosed in this document. In this case, the processor 1912 and the memory 1914 may be part of a communication modem/circuit/chip designed to implement a radio communication technology (e.g. LTE or NR). The transceiver 1916 may be connected to the processor 1912 and may transmit and/or receive a radio signal through one or more antennas 1918. The transceiver 1916 may include a transmitter and/or a receiver. The transceiver 1916 may be interchangeably used with a radio frequency (RF) unit. In the present disclosure, the wireless device may mean a communication modem/circuit/chip.

The second wireless device 1920 includes one or more processors 1922, one or more memories 1924. Additionally, the second wireless device 1920 may further include one or more transceivers 1926 and/or one or more antennas 1928. The processor 1922 may be configured to control the memory 1924 and/or the transceiver 1926 and to implement the descriptions, functions, procedures, proposals, methods and/or operational flowcharts disclosed in this document. For example, the processor 1922 may generate a third information/signal by processing information within the memory 1924, and may transmit a radio signal including the third information/signal through the transceiver 1926. Furthermore, the processor 1922 may receive a radio signal including a fourth information/signal through the transceiver 1926, and may store, in the memory 1924, information obtained from the signal processing of the fourth information/signal. The memory 1924 may be connected to the processor 1922 and may store various pieces of information related to an operation of the processor 1922. For example, the memory 1924 may store a software code including instructions for performing some of or all processes controlled by the processor 202 or performing the descriptions, functions, procedures, proposals, methods and/or operational flowcharts disclosed in this document. In this case, the processor 1922 and the memory 1924 may be part of a communication modem/circuit/chip designed to implement a radio communication technology (e.g. LTE or NR). The transceiver 1926 may be connected to the processor 1922 and may transmit and/or receive a radio signal through one or more antennas 1928. The transceiver 1926 may include a transmitter and/or a receiver. The transceiver 1926 may be interchangeably used with an RF unit. In the present disclosure, the wireless device may mean a communication modem/circuit/chip.

Hereinafter, the hardware elements of the wireless device 1910, 1920 are described more specifically. Although the disclosure is not limited to the hardware elements, one or more protocol layers may be implemented by one or more processors 1912, 1922. For example, the one or more processors 1912, 1922 may implement one or more layers (e.g. functional layers such as PHY, MAC, RLC, PDCP, RRC, and SDAP. The one or more processors 1912, 1922 may generate one or more protocol data units (PDUs) and/or one or more service data units (SDUs) based on the descriptions, functions, procedures, proposals, methods and/or operational flowcharts disclosed in this document. The one or more processors 1912, 1922 may generate a message, control information, data or information based on the descriptions, functions, procedures, proposals, methods and/or operational flowcharts disclosed in this document. The one or more processors 1912, 1922 may generate a signal (e.g. baseband signal) including a PDU, an SDU, a message, control information, data or information based on a function, procedure, proposal and/or method disclosed in this document, and may provide the signal to the one or more transceivers 1916, 1926. The one or more processors 1912, 1922 may receive a signal (e.g. baseband signal) from the one or more transceivers 1916, 1926, and may obtain a PDU, an SDU, a message, control information, data or information based on the descriptions, functions, procedures, proposals, methods and/or operational flowcharts disclosed in this document.

The one or more processors 1912, 1922 may be denoted as a controller, a micro controller, a micro processor or a micro computer. The one or more processors 1912, 1922 be implemented using hardware, firmware, software or a combination of them. For example, one or more application specific integrated circuits (ASICs), one or more digital signal processors (DSPs), one or more digital signal processing devices (DSPDs), one or more programmable logic devices (PLDs) or one or more field programmable gate arrays (FPGAs) may be included in the one or more processors 1912, 1922. The descriptions, functions, procedures, proposals, methods and/or operational flowcharts disclosed in this document may be implemented using firmware or software. The firmware or software may be implemented to include a module, a procedure, a function, etc. The firmware or software configured to perform the descriptions, functions, procedures, proposals, methods and/or operational flowcharts disclosed in this document may be included in the one or more processors 1912, 1922 or stored in the one or more memories 1914, 1924, and may be driven by the one or more processors 1912, 1922. The descriptions, functions, procedures, proposals, methods and/or operational flowcharts disclosed in this document may be implemented using firmware or software in a set form of codes, instructions and/or instructions.

The one or more memories 1914, 1924 may be connected to the one or more processors 1912, 1922 and may store various forms of data, signals, messages, information, programs, code, indications and/or instructions. The one or more memories 1914, 1924 may be configured with ROM, RAM, EPROM, a flash memory, a hard drive, a register, a cache memory, a computer-readable storage medium and/or a combination of them. The one or more memories 1914, 1924 may be positioned inside and/or outside the one or more processors 1912, 1922. Furthermore, the one or more memories 1914, 1924 may be connected to the one or more processors 1912, 1922 through various technologies such as a wired or wireless connection.

The one or more transceivers 1916, 1926 may transmit, to one or more other devices, user data, control information, or a radio signal/channel described in the method and/or operational flowchart of this document. The one or more transceivers 1916, 1926 may receive, from one or more other devices, user data, control information or a radio signal/channel described in the description, function, procedure, proposal, method and/or operational flowchart disclosed in this document. For example, the one or more transceivers 1916, 1926 may be connected to the one or more processors 1912, 1922 and may transmit and receive radio signals. For example, the one or more processors 1912, 1922 may control the one or more transceivers 1916, 1926 to transmit user data, control information or a radio signal to one or more other devices. Furthermore, the one or more processors 1912, 1922 may control the one or more transceivers 1916, 1926 to receive user data, control information or a radio signal from one or more other devices. Furthermore, the one or more transceivers 1916, 1926 may be connected to the one or more antennas 1918, 1928. The one or more transceivers 1916, 1926 may be configured to transmit and receive user data, control information, or radio signals/channels, described in the description, function, procedure, proposal, method and/or operational flowchart disclosed in this document, through the one or more antennas 1918, 1928. In this document, the one or more antennas may be a plurality of physical antennas or may be a plurality of logical antennas (e.g. antenna ports). The one or more transceivers 1916, 1926 may convert received user data, control information or radio signal/channel from an RF band signal to a baseband signal in order to process the received user data, control information or radio signal/channel using the one or more processors 1912, 1922. The one or more transceivers 1916, 1926 may convert the user data, control information or radio signal/channel, processed by the one or more processors 1912, 1922, from a baseband signal to an RF band signal. To this end, the one or more transceivers 1916, 1926 may include an (analog) oscillator and/or a filter.

Figure 20:
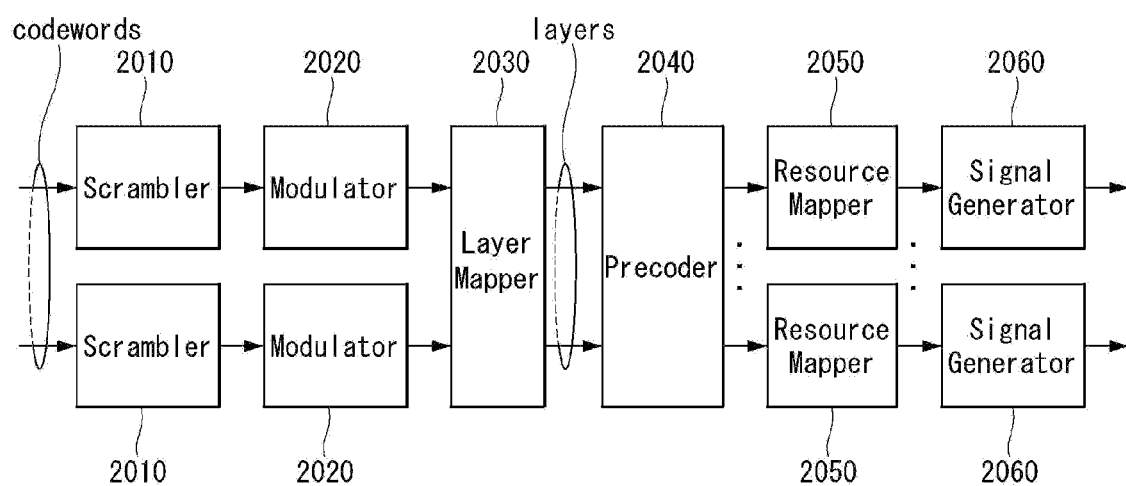
FIG. 20 is an example of a signal processing circuit for a transmission signal, which may be applied to the present disclosure.

Example of a Signal Processing Circuit to which the Present Disclosure is Applied FIG. 20 is an example of a signal processing circuit for a transmission signal, which may be applied to the present disclosure.

Referring to FIG. 20, a signal processing circuit 2000 may include a scrambler 2010, a modulator 2020, a layer mapper 2030, a precoder 2040, a resource mapper 2050, and a signal generator 2060, but is not limited thereto. An operation/function of FIG. 20 may be performed in the processor 1912, 1922 and/or the transceiver 1916, 1926 of FIG. 19. The hardware elements of FIG. 20 may be implemented in the processor 1912, 1922 and/or the transceiver 1916, 1926 of FIG. 19. For example, the blocks 2010-2060 may be implemented in the processor 1912, 1922 of FIG. 19. Furthermore, the blocks 2010-2050 may be implemented in the processor 1912, 1922 of FIG. 19, and the block 2060 may be implemented in the transceiver 1916, 1926 of FIG. 19.

Codewords may be converted into a radio signal through the signal processing circuit 2000 of FIG. 20. In this case, the codewords are a coded bit sequence of an information block. The information block may include a transport block (e.g. UL-SCH transport block, DL-SCH transport block). The radio signal may be transmitted through various physical channels (e.g. PUSCH, PDSCH).

Specifically, the codewords may be converted into a bit sequence scrambled by the scrambler 2010. A scramble sequence used for scrambling is generated based on an initialization value. The initialization value may include ID information of a wireless device. The scrambled bit sequence may be modulated into a modulation symbol sequence by the modulator 2020. A modulation method may include pi/2-binary phase shift keying (pi/2-BPSK), m-phase shift keying (m-PSK), and m-quadrature amplitude modulation (m-QAM). A complex modulation symbol sequence may be mapped to one or more transmission layers by the layer mapper 2030. The modulation symbols of each transmission layer may be mapped (precoding) to a corresponding antenna port(s) by the precoder 2040. The output z of the precoder 2040 may be obtained by multiplying the output y of the layer mapper 2030 by a precoding matrix W of N*M. In this case, N is the number of antenna ports, and M is the number of transmission layers. In this case, the precoder 2040 may perform precoding after performing transform precoding (e.g. DFT transform) on complex modulation symbols. Furthermore, the precoder 2040 may perform precoding without performing transform precoding.

The resource mapper 2050 may map the modulation symbols of each antenna port to a time-frequency resource. The time-frequency resource may include a plurality of symbols (e.g. CP-OFDMA symbols, DFT-s-OFDMA symbols) in the time domain, and may include a plurality of subcarriers in the frequency domain. The signal generator 2060 generates a radio signal from the mapped modulation symbols, and may transmit the generated radio signal to another device through each antenna. To this end, the signal generator 2060 may include an inverse fast Fourier transform (IFFT) module and a cyclic prefix (CP) inserter, a digital-to-analog converter (DAC), a frequency uplink converter, etc.

A signal processing process for a received signal in a wireless device may be configured inversely to the signal processing process 2010-2060 of FIG. 20. For example, a wireless device (e.g. 1910, 1920 in FIG. 19) may receive a radio signal from the outside through an antenna port/transceiver. The received radio signal may be converted into a baseband signal through a signal reconstructor. To this end, the signal reconstructor may include a frequency downlink converter, an analog-to-digital converter (ADC), a CP remover, and a fast Fourier transform (FFT) module. Thereafter, the baseband signal may be reconstructed into a codeword through a resource de-mapper process, a postcoding process, a demodulation process and a de-scramble process. The codeword may be reconstructed into the original information block through decoding. Accordingly, a signal processing circuit (not illustrated) for a received signal may include a signal reconstructor, a resource de-mapper, a post-coder, a demodulator, a de-scrambler and a decoder.

Example in which a Wireless Device to which the Present Disclosure is Used

Figure 21:
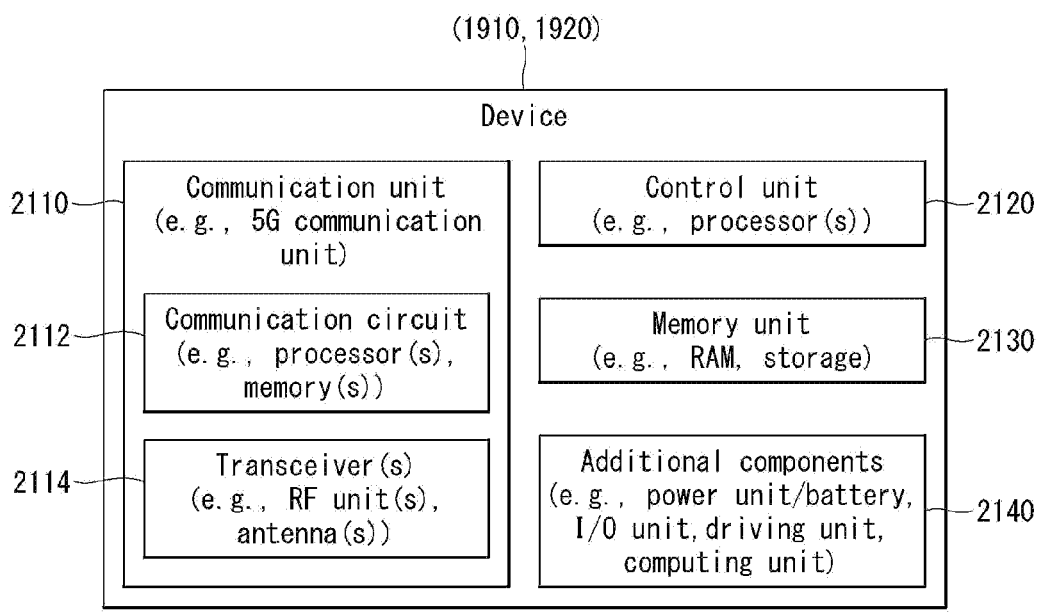
FIG. 21 is another example of a wireless device which may be applied to the present disclosure.

FIG. 21 is another example of a wireless device which may be applied to the present disclosure. The wireless device may be implemented in various forms depending on a use-example/service (refer to FIG. 18).

Referring to FIG. 21, a wireless device 1910, 1920 corresponds to the wireless device 1910, 1920 in FIG. 19, and may be configured with various elements, components, units and/or module. For example, the wireless device 1910, 1920 may include a communication unit 2110, a control unit 2120, a memory unit 2130 and additional elements 2140. The communication unit may include a communication circuit 2112 and a transceiver(s) 2114. For example, the communication circuit 2112 may include the one or more processors 1912, 1922 and/or one or more memories 1914, 1924 in FIG. 19. For example, the transceiver(s) 2114 may include the one or more transceivers 1916, 1926 and/or one or more antennas 1918, 1928 in FIG. 19. The control unit 2120 is electrically connected to the communication unit 2110, the memory unit 2130 and the additional elements 2140, and controls an overall operation of the wireless device. For example, the control unit 2120 may control an electrical/mechanical operation of the wireless device based on a program/code/instruction/information stored in the memory unit 2130. Furthermore, the control unit 2120 may transmit information stored in the memory unit 2130 to the outside (e.g. another communication device) through a wireless/wired interface using the communication unit 2110, or may store, in the memory unit 2130, information received through the wireless/wired interface from the outside (e.g. another communication device) using the communication unit 2110.

The additional elements 2140 may be variously configured depending on the type of wireless device. For example, the additional elements 2140 may include at least one of a power unit/battery, an input/output (I/O unit), a driving unit and a computing unit, but are not limited thereto. The wireless device may be implemented in a form, such as a robot (FIG. 18, 10000*a*), a vehicle (FIG. 18, 10000*b*-1, 10000*b*-2), an XR device (FIG. 18, 10000*c*), a mobile device (FIG. 18, 10000*d*), home appliances (FIG. 18, 10000*e*), an IoT device (FIG. 18, 10000*f*), a UE for digital broadcast, a hologram device, a public safety device, an MTC device, a medical device, a FinTech device (or financial device), a security device, a climate/environment device, an AI server/device (FIG. 18, 40000), a base station (FIG. 18, 20000), or a network node. The wireless device may be movable depending on a use-example/service or may be used at a fixed place.

In FIG. 21, all of the various elements, components, units and/or modules within the wireless device 1910, 1920 may be interconnected through a wired interface or at least some of them may be wirelessly connected through the communication unit 2110. For example, in the wireless device 1910, 1920, the control unit 2120 and the communication unit 2110 may be connected over wires. The control unit 2120 and a first unit (e.g. 2130, 2140) may be wirelessly connected through the communication unit 2110. Furthermore, each of the elements, components, units and/or modules within the wireless device 1910, 1920 may further include one or more elements. For example, the control unit 2120 may be configured as a set of one or more processors. For example, the control unit 2120 may be configured as a set of communication control processors, application processors, electronic control units (ECUs), graphic processing processors, or memory control processors. For another example, the memory unit 2130 may be configured as a random access memory (RAM), a dynamic RAM (DRAMO), a read only memory (ROM), a flash memory, a volatile memory, a non-volatile memory and/or a combination of them.

Reference Related to the Present Disclosure

In the present disclosure, the wireless device may be a base station, a network node, a transmission terminal, a reception terminal, a wireless device, a wireless communication device, a vehicle, a vehicle having an autonomous driving function, an unmanned aerial vehicle (UAV), an artificial intelligence (AI) module, a robot, an augmented reality (AR) device, a virtual reality (VR) device, an MTC device, an IoT device, a medical device, a FinTech device (or financial device), a security device, a climate/environment device or a device related to a fourth industrial revolution field or 5G service. For example, the drone may be a flight vehicle that flies by a wireless control signal without a person being on the flight vehicle. For example, the MTC device and the IoT device is a device that does not require a person's direct intervention or manipulation, and may include a smart meter, a vending machine, a thermometer, a smart bulb, a door lock or a variety of sensors. For example, the medical device may be a device used for the purpose of diagnosing, treating, reducing, handling or preventing a disease or a device used for the purpose of testing, substituting or modifying a structure or function, and may be a device for medical treatment, a device for operation, a device for (external) diagnosis, a hearing aid or a device for a surgical procedure. For example, the security device may be a device installed to prevent a possible danger and to maintain safety, and may be a camera, CCTV, or a blackbox. For example, the FinTech device may be a device capable of providing financial services, such as mobile payment, and may be a payment device or point of sales (POS). For example, the climate/environment device may mean a device for monitoring or predicting the climate/environment.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In the present disclosure, the UE may include a mobile phone, a smartphone, a laptop computer, a terminal for digital broadcast, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head-mount display (HMD)), and a foldable device. For example, the HMD is a display device of a type worn on the head, and may be used to implement a VR or AR In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

The present disclosure has been described as being applied to the 3GPP LTE/LTE-A/NR systems, but may be applied to various wireless communication systems in addition to the 3GPP LTE/LTE-A/NR systems.

What is claimed is:

1. A method of reporting, by a user equipment (UE), hybrid automatic repeat and request-acknowledgment (HARQ-ACK) information in a wireless communication system, the method comprising:
   receiving a first physical downlink control channel (PDCCH) related to a first control resource set (CORESET) group;
   receiving a second PDCCH related to a second CORESET group;
   receiving a first physical downlink shared channel (PDSCH) based on the first PDCCH;
   receiving a second PDSCH based on the second PDCCH;
   generating (i) a first HARQ-ACK codebook for the first PDSCH and (ii) a second HARQ-ACK codebook for the second PDSCH separately;
   concatenating the first HARQ-ACK codebook followed by the second HARQ-ACK codebook; and
   reporting the HARQ-ACK information based on the concatenated HARQ-ACK codebook.

2. The method of claim 1, further comprising:
   receiving type information for a HARQ-ACK codebook set to 'semi-static',
   wherein the first CORESET group has a different index than the second CORESET group.

3. The method of claim 1,
   wherein a total bit number of the HARQ-ACK information is determined based on concatenation of the first HARQ-ACK codebook and the second HARQ-ACK codebook.

4. The method of claim 1,
   wherein the first HARQ-ACK codebook is related to a first CORESET included in the first CORESET group, and
   wherein the second HARQ-ACK codebook is related to a second CORESET included in the second CORESET group.

5. The method of claim 4,
   wherein based on an index of the first CORESET group having a smaller value than an index of the second CORESET group, the first HARQ-ACK codebook is concatenated followed by the second HARQ-ACK codebook.

6. The method of claim 1,
   wherein the HARQ-ACK information is transmitted via a physical uplink control channel (PUCCH).

7. The method of claim 6,
   wherein each of the first PDCCH and the second PDCCH includes a field for indicating a time duration between a timing of a PDSCH reception and a timing of the PUCCH transmission.

8. The method of claim 1, further comprising:
   receiving configuration information related to the first CORESET and the second CORESET.

9. The method of claim 1, wherein the first PDCCH and the first PDSCH are received through a first transmission and reception point, and the second PDCCH and the second PDSCH are received through a second transmission and reception point.

10. The method of claim 9, wherein the first CORESET group corresponds to the first transmission and reception point, and the second CORESET group corresponds to the second transmission and reception point.

11. A processing apparatus configured to control a user equipment (UE) to report hybrid automatic repeat and request-acknowledgment (HARQ-ACK) information in a wireless communication system, the processing apparatus comprising:
   at least one processor; and
   at least one memory operably connectable to the at least one processor and storing instructions that, based on being executed by the at least one processor, perform operations comprising:
      receiving a first physical downlink control channel (PDCCH) related to a first CORESET group;
      receiving a second PDCCH related to a second CORESET group;
      receiving a first physical downlink shared channel (PDSCH) based on the first PDCCH;
      receiving a second PDSCH based on the second PDCCH;
      generating (i) a first HARQ-ACK codebook for the first PDSCH and (ii) a second HARQ-ACK codebook for the second PDSCH separately;
      concatenating the first HARQ-ACK codebook followed by the second HARQ-ACK codebook; and
      reporting the HARQ-ACK information based on the concatenated HARQ-ACK codebook.

12. The processing apparatus of claim 11, wherein the operations further comprise:
   receiving type information for a HARQ-ACK codebook set to 'semi-static',
   wherein the first CORESET group has a different index than the second CORESET group.

13. The processing apparatus of claim 11,
   wherein a total bit number of the HARQ-ACK information is determined based on concatenation of the first HARQ-ACK codebook and the second HARQ-ACK codebook.

14. The processing apparatus of claim 11,
   wherein the first HARQ-ACK codebook is related to a first CORESET included in the first CORESET group, and
   wherein the second HARQ-ACK codebook is related to a second CORESET included in the second CORESET group.

15. The processing apparatus of claim 14,
   wherein based on an index of the first CORESET group having a smaller value than an index of the second CORESET group, the first HARQ-ACK codebook is concatenated followed by the second HARQ-ACK codebook.

16. The processing apparatus of claim 11,
   wherein the HARQ-ACK information is transmitted via a physical uplink control channel (PUCCH).

17. A non-transitory computer-readable storage medium storing at least one instruction that, based on being executed by at least one processor, perform operations comprising:
   receiving a first physical downlink control channel (PDCCH) related to a first CORESET group;
   receiving a second PDCCH related to a second CORESET group;
   receiving a first physical downlink shared channel (PDSCH) based on the first PDCCH;
   receiving a second PDSCH based on the second PDCCH;
   generating (i) a first hybrid automatic repeat and request-acknowledgment (HARQ-ACK) codebook for the first PDSCH and (ii) a second HARQ-ACK codebook for the second PDSCH separately;
   concatenating the first HARQ-ACK codebook followed by the second HARQ-ACK codebook; and
   reporting HARQ-ACK information based on the concatenated HARQ-ACK codebook.

18. The non-transitory computer-readable storage medium of claim 17, wherein the operations further comprise:
  receiving type information for a HARQ-ACK codebook set to 'semi-static',
  wherein the first CORESET group has a different index than the second CORESET group.

19. The non-transitory computer-readable storage medium of claim 17,
  wherein a total bit number of the HARQ-ACK information is determined based on concatenation of the first HARQ-ACK codebook and the second HARQ-ACK codebook.

\* \* \* \* \*